US012811294B2

(12) United States Patent
Shi

(10) Patent No.: US 12,811,294 B2
(45) Date of Patent: Nov. 24, 2026

(54) CIRCULARLY POLARIZED ANTENNA AND DUAL-FREQUENCY CIRCULARLY POLARIZED ANTENNA

(71) Applicant: GUANGDONG COROS SPORTS TECHNOLOGY CO., LTD, Dongguan (CN)

(72) Inventor: Xianwei Shi, Dongguan (CN)

(73) Assignee: GUANGDONG COROS SPORTS TECHNOLOGY CO., LTD, Dongguan (CN)

(*) Notice: Subject to any disclaimer, the term of this patent is extended or adjusted under 35 U.S.C. 154(b) by 0 days.

(21) Appl. No.: 19/220,888

(22) Filed: May 28, 2025

(65) Prior Publication Data

US 2025/0293432 A1 Sep. 18, 2025

Related U.S. Application Data

(63) Continuation of application No. PCT/CN2023/107207, filed on Jul. 13, 2023.

(51) Int. Cl.
*H01Q 7/00* (2006.01)
*H01Q 5/10* (2015.01)
(Continued)

(52) U.S. Cl.
CPC ............... *H01Q 5/314* (2015.01); *H01Q 5/10* (2015.01); *H01Q 5/28* (2015.01)

(58) Field of Classification Search
CPC ............ H01Q 5/314; H01Q 5/10; H01Q 5/28; H01Q 1/273; H01Q 5/321; H01Q 5/328; H01Q 7/00
See application file for complete search history.

(56) References Cited

U.S. PATENT DOCUMENTS

| | | | | |
|---|---|---|---|---|
| 5,751,252 | A | 5/1998 | Phillips | |
| 2012/0188917 | A1* | 7/2012 | Knox | H01Q 1/2216 370/277 |
| 2025/0007162 | A1 | 1/2025 | Zhao | |

FOREIGN PATENT DOCUMENTS

| | | | |
|---|---|---|---|
| CN | 1081836 | C | 3/2002 |
| CN | 205752517 | U | 11/2016 |

(Continued)

OTHER PUBLICATIONS

International Search Report for International Application No. PCT/CN2023/107207; Mailing Date, Mar. 5, 2024, 4 pages.

(Continued)

*Primary Examiner* — David E Lotter
(74) *Attorney, Agent, or Firm* — CANTOR COLBURN LLP

(57) ABSTRACT

A circularly polarized antenna is provided, including a main board; an annular radiator provided with an access portion; a feeding terminal, one end of the feeding terminal is electrically connected to the radiator at a feeding point, and the other end of the feeding terminal is electrically connected to the main board; a frequency tunning component which is configured to adjust a frequency of the communication frequency band of the circularly polarized antenna, and is electrically connected to the radiator at the access portion. A first connecting line is a line connecting the feeding point and a center point of the annular radiator, a second connecting line is a line connecting the access portion and the center point of the radiator, and the first connecting line and a second connecting line form a first included angle α along a counterclockwise circumferential direction of the radiator, where, $\alpha \in (80°, 100°) \cup (170°, 190°) \cup (260°, 280°)$.

22 Claims, 8 Drawing Sheets

(51) Int. Cl.
*H01Q 5/28* (2015.01)
*H01Q 5/314* (2015.01)

(56) References Cited

FOREIGN PATENT DOCUMENTS

| | | | |
|---|---|---|---|
| CN | 107317107 | A | 11/2017 |
| CN | 110444867 | A | 11/2019 |
| CN | 111490344 | A | 8/2020 |
| CN | 212626049 | U | 2/2021 |
| CN | 213425185 | U | 6/2021 |
| CN | 114846696 | A | 8/2022 |
| CN | 116191027 | A | 5/2023 |
| KR | 100850504 | B1 | 7/2008 |

OTHER PUBLICATIONS

Written Opinion for International Application No. PCT/CN2023/107207; Mailing Date, Mar. 5, 2024, 3 pages.

* cited by examiner

CIRCULARLY POLARIZED ANTENNA AND DUAL-FREQUENCY CIRCULARLY POLARIZED ANTENNA

CROSS-REFERENCE TO RELATED APPLICATIONS

This application claims priority to and is a continuation of International Application No. PCT/CN2023/107207, filed on Jul. 13, 2023, the entire disclosure of which is hereby incorporated by reference in its entirety.

FIELD OF TECHNOLOGY

The present application relates to the field of antenna technology, more particularly to a circularly polarized antenna and a dual-frequency circularly polarized antenna.

BACKGROUND

With the rapid growth of positioning and communication demands for wearable devices in daily life, there is an increasing need for regular tunning of the operating frequency of circularly polarized antennas in wearable devices. However, in the existing technologies, the electronic components used for circular polarization are simultaneously employed to adjust the operating frequency of the circular polarization. Moreover, due to the constraints imposed by the physical dimensions of the antenna structure, the complexity of adjusting the operating frequency of the antenna is increased, and the efficiency of such adjustment is reduced.

The existing technology suffers from the issues of increased complexity in adjusting the operating frequency of the antenna and reduced efficiency in such adjustment process.

SUMMARY

One of objectives of the embodiments of the present application is to provide a circularly polarized antenna and a dual-frequency circularly polarized antenna, aiming to address the technical issues in terminal devices where the complexity of adjusting the operating frequency of the antenna is increased, and the adjustment efficiency of the antenna's operating frequency is reduced.

Technical scheme adopted in the embodiments of the present application are as follows:

In accordance with a first aspect, an embodiment of the present application provides a circularly polarized antenna, including:

a main board;

an annular radiator, the radiator being provided with an access portion;

a feeding terminal, one end of the feeding terminal being electrically connected to the radiator at a feeding point, and another end of the feeding terminal being electrically connected to the main board;

a frequency tunning component, configured to adjust a frequency of the communication frequency band of the circularly polarized antenna, the frequency tunning component being electrically connected to the radiator at the access portion;

wherein, a first connecting line including the feeding point and a second connecting line including the access portion form a first included angle along a first direction, the first connecting line is a line connecting the feeding point and a center point of the annular radiator, the second connecting line is a line connecting a center point of the access portion and the center point of the radiator, and the first direction is a counterclockwise circumferential direction along the radiator; and wherein, $\alpha \in (80°, 100°) \cup (170°, 190°) \cup (260°, 280°)$, and $\alpha$ is the first included angle.

In accordance with a second aspect, an embodiment of the present application provides a dual-frequency circularly polarized antenna, including:

a main board;

an annular radiator, the radiator being provided with an access portion;

a feeding terminal, one end of the feeding terminal being electrically connected to the radiator at a feeding point, and another end of the feeding terminal being electrically connected to the main board; and a frequency modulation (FM) filter component being electrically connected to the access portion, the FM filter component being configured to filter out signals in a second communication frequency band when adjusting a frequency of a first communication frequency band of the circularly polarized antenna; or alternatively, being configured to filter out signals in the first communication frequency band when adjusting a frequency of the second communication frequency band of the circularly polarized antenna.

The first aspect of the embodiments of the present application provides at least the following beneficial effect: the circularly polarized antenna provided by the embodiment of the present application includes: a main board, an annular radiator, a feeding terminal, and a frequency tunning component. The radiator is provided with an access portion. One end of the feeding terminal is electrically connected to the radiator at the feeding point, and the other end of the feeding terminal is electrically connected to the main board. The frequency tunning component is configured to adjust a frequency of the communication frequency band of the circularly polarized antenna, and the frequency tunning component is electrically connected to the radiator at the access portion. The first connecting line including the feeding point and the second connecting line including the access portion form the first included angle along the first direction, the first connecting line is the line connecting the feeding point and the center point of the annular radiator, the second connecting line is the line connecting the access portion and the center point of the radiator, and the first direction is the counterclockwise circumferential direction along the radiator; where $\alpha \in (80°, 100°) \cup (170°, 190°) \cup (260°, 280°)$, and a is the first included angle.

Due to that the grounding terminal or the breakpoint is arranged at a position where a resonant current weak zone of a first mode of the circularly polarized annular radiator overlaps with a resonant current strong zone of a second mode or where a resonant current strong zone of the first mode overlaps with a resonant current weak zone of the second mode. The feeding terminal is provided at a feeding point located midway between a weakest point of resonant current in the first mode and an adjacent weakest point of resonant current in the second mode of the circularly polarized annular radiator. The access portion is arranged at a position where the resonance current of the first mode is substantially the same as the resonance current of the second mode. The frequency tunning component is connected to the radiator via the access portion, and the frequency tunning component has the same tunning effect on the resonant frequency of the first mode and the resonant frequency of the second mode. Here, except for the position occupied by the feeding point, the access portion can be arranged at any position where the first included angle being (80°, 100°) or (170°, 190°) or (260°, 280°) on the annular radiator. Therefore, when the frequency tunning component adjusts the operating frequency of the circularly polarized antenna through the access portion at a position where the resonant current of the first mode is substantially the same as the resonant current of the second mode, the phase difference between the resonant phase of the first mode and the resonant phase of the second mode of the circularly polarized antenna is always maintained at 90°, which does not affect the formation of the circularly polarized antenna, thereby the adjustment complexity of the antenna's operating frequency is reduced and the adjustment efficiency of the antenna's operating frequency is improved.

The second aspect of the embodiments of the present application has at least the following beneficial effects: the dual-frequency circularly polarized antenna provided in the embodiment of the present application includes: a main board, an annular radiator, a feeding terminal, and an FM filter component. The radiator is provided with an access portion. One end of the feeding terminal is electrically connected to the radiator at a feeding point, and the other end of the feeding terminal is electrically connected to the main board. The FM filter component is electrically connected to the access portion, and the FM filter component is configured to filter out signals in a second communication frequency band when adjusting a frequency of a first communication frequency band of the circularly polarized antenna; or alternatively, configured to filter out signals in the first communication frequency band when adjusting a frequency of the second communication frequency band of the circularly polarized antenna. The feeding point and the access portion are respectively arranged at preset positions of the radiator.

Due to that two grounding terminals or two breakpoints are respectively arranged on the annular radiator at positions where the resonant current weak zone of the first mode overlaps with the resonant current strong zone of the second mode or the resonant current strong zone of the first mode overlaps with the resonant current weak zone of the second mode. The access portion and the feeding point are respectively arranged at the preset positions where the resonance current of the first mode is substantially the same as the resonance current of the second mode. The frequency tunning component is connected to the radiator via the access portion, the frequency tunning component has the same tunning effect on the resonance frequency of the first mode and the resonance frequency of the second mode, so when the frequency tunning component adjusts the operating frequency of the circularly polarized antenna through the access portion at the position where the resonance current of the first mode is substantially the same as the resonance current of the second mode, the phase difference between the resonance phase of the first mode and the resonance phase of the second mode of the circularly polarized antenna is always maintained at 90°, which does not affect the formation of the dual-frequency circularly polarized antenna, thereby the adjustment complexity of the antenna's operating frequency is reduced and the adjustment efficiency of the antenna's operating frequency is improved.

Therefore, the circularly polarized antenna provided in the embodiment of the present application is provided with an access portion at a preset position where the resonant current of the first mode is substantially the same as the resonant current of the second mode, and the frequency tunning component is connected to the radiator through the access portion. The frequency tunning component adjusts both the resonant frequency of the first mode and the resonant frequency of the second mode without affecting the formation of circular polarization of the antenna, which reduces the adjustment complexity of the antenna's operating frequency and improves the adjustment efficiency of the antenna's operating frequency. 20. Additionally, since only a single annular radiator is required to achieve both frequency tuning and circularly polarized antenna functionality, the number of radiators is reduced, minimizing the spatial footprint of the circularly polarized antenna. This contributes to the compact design of terminal devices and enhances the satellite positioning performance of the terminal devices.

BRIEF DESCRIPTION OF THE DRAWINGS

In order to illustrate the technical schemes in the embodiments of the present application more clearly, the drawings required to be used in descriptions of the embodiments or exemplary technologies will be briefly introduced below. Obviously, the drawings described below are merely some embodiments of the present application. For ordinary technicians in this field, other drawings may also be obtained based on these drawings without exerting creative efforts.

Figure 1:
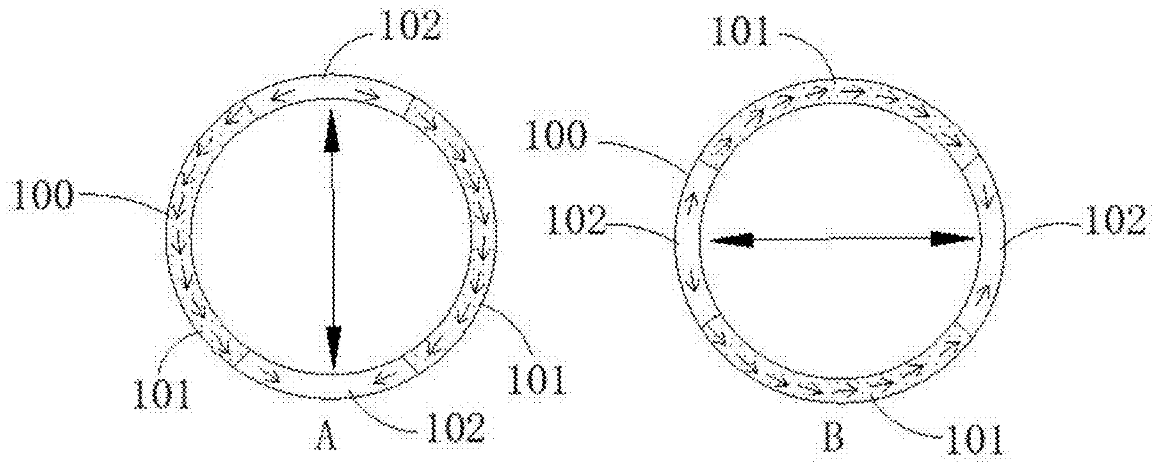
FIG. 1 is a schematic diagram of a resonant frequency of a complete annular radiator in a first mode and a second mode provided in an embodiment of the present application.

Reference signs in the drawings are listed as follows:

100, radiator; 101, resonant current strong zone; 102, resonant current weak zone; 200, feeding terminal;

300, first circularly-polarized breakpoint; 400, main board; 500, second circularly-polarized breakpoint;

600, first access portion; 610, first breakpoint; 620, first electrical coupling module; 630, second electrical coupling module;

700, frequency tunning component; 800, second access portion; 810, second breakpoint; 820, third electrical coupling module; 830, fourth electrical coupling module; and

900, FM filter component; 910, first FM filter component; 911, first frequency modulation element; 912, first filter element; 920, second FM filter component; 921, second frequency modulation element; 922, second filter element.

DETAILED DESCRIPTION OF THE EMBODIMENTS

To clarify the objectives, technical schemes, and advantages of the present application, the present application is further described in detail below in combination with the drawings and embodiments. It should be understood that the specific embodiments described herein are only used to explain the present application and are not intended to limit the present application.

It should be noted that various steps recorded in the method implementation of the present application may be executed in different orders and/or in parallel. In addition, the method implementation may include additional steps and/or omit the steps shown. The scope of the present application is not limited in this respect. The term “including” and its variations used herein are of an inclusive nature that is open-ended, meaning “including but not limited to”. The term “based on” means “at least partially based on”. The term “one embodiment” means “at least one embodiment”. The term “another embodiment” means “at least one other embodiment”. The term “some embodiments” means “at least some embodiments”. The relevant definitions of other terms will be given in the following description. It should be noted that the concepts of “first”, “second”, etc. mentioned in the present application are only used to distinguish different devices, modules or units, and are not used to limit the sequence or interdependence of the functions performed by these devices, modules or units.

The rapid increase in positioning and communication requirements of wearable devices in life requires normal tunning of the operating frequency of the circularly polarized antenna of the wearable device. In the existing technologies, the electronic components used for circular polarization are simultaneously employed to adjust the operating frequency of the circular polarization. Moreover, due to the constraints imposed by the physical dimensions of the antenna structure, the complexity of adjusting the operating frequency of the antenna is increased, and the adjustment efficiency of the operating frequency of the antenna is reduced.

The existing technology suffers from the issues of increased complexity of adjusting the operating frequency of the antenna and reduced efficiency of adjusting the operating frequency of the antenna.

In addition, most of the existing smart terminals (such as wearable devices) are merely capable of receiving or transmitting frequency signals. For instance, these smart terminals can only receive GPS positioning signals, or can only receive and transmit Bluetooth signals. To meet the conventional requirements of receiving and transmitting of Bluetooth signals and positioning of wearable devices, as well as the communication requirements of wearable devices. In the existing technology, the antenna for a wearable device is separated and arranged in different positions. One part of the antenna is used for receiving and transmitting frequency signals, while the other part is used for receiving single-band or multi-band signals, causing the antennas at different parts to interfere with each other, which affects the performance of the antenna. For instance, the antennas of most smartwatches are made by integrating GPS dual-frequency L1/L5 antennas onto the metal ring, while BT/WIFI antennas are separately installed on side walls or brackets using steel sheets or FPCS. This will take up a lot of space inside the watch, and the BT/WIFI antenna is built inside, so the radiation effect is not very good either.

The existing technologies involve setting up metal antennas at different locations, which will cause mutual interference to the antennas, affect the performance of the antennas, and also increase the space occupied by the antennas.

In the existing technologies, circularly polarized antennas can be realized in the following two ways:

The first way is to form circular polarization with two lines of currents having an equal amplitude and orthogonal with a phase difference of 90°;

The second way is to form circular polarization with a rotating circular current whose effective circumference of the annular radiator is an integer multiple of the wavelength.

In one embodiment of the present application, as shown in FIG. 1, when no breakpoint is provided on the radiator 100, that is, the radiator 100 is a complete ring, a resonant current of a first mode of the radiator 100 (as shown in pattern A of FIG. 1) and a resonant current of a second mode of the radiator 100 (as shown in pattern B of FIG. 1) are perpendicular to each other, have the same amplitude, and have the same phase (that is, the same resonant frequency), in this case, the radiator 100 is equivalent to a linearly polarized antenna.

The resonant current of the radiator 100 in the first mode is shown in pattern A of FIG. 1. The pattern A in FIG. 1 shows that the resonant current flows from top to bottom. The resonant current may also flow from bottom to top. The density of arrows in the pattern A of FIG. 1 represents a magnitude of the current, and the area with dense arrows is the resonant current strong zone 101, and the area outside the resonant current strong zone 101 is the resonant current weak zone 102. Each resonant current weak zone 102 contains a current zero point. It can be seen that the radiator 100 in the first mode includes two resonant current strong zones 101 and two resonant current weak zones 102.

The resonant current of the radiator 100 in the second mode is shown in pattern B of FIG. 1. The pattern B in FIG. 1 only shows the flow direction of the resonant current from left to right. The resonant current can also flow from right to left. The density of the arrows in the pattern B of FIG. 1 represents the magnitude of the current. The area with dense arrows is the strong resonant current area 101, and the area outside the strong resonant current area 101 is the weak resonant current area 102. Each weak resonant current area 102 contains a current zero point. It can be seen that the radiator 100 in the second mode includes two strong resonant current areas 101 and two weak resonant current areas 102.

Figure 2:
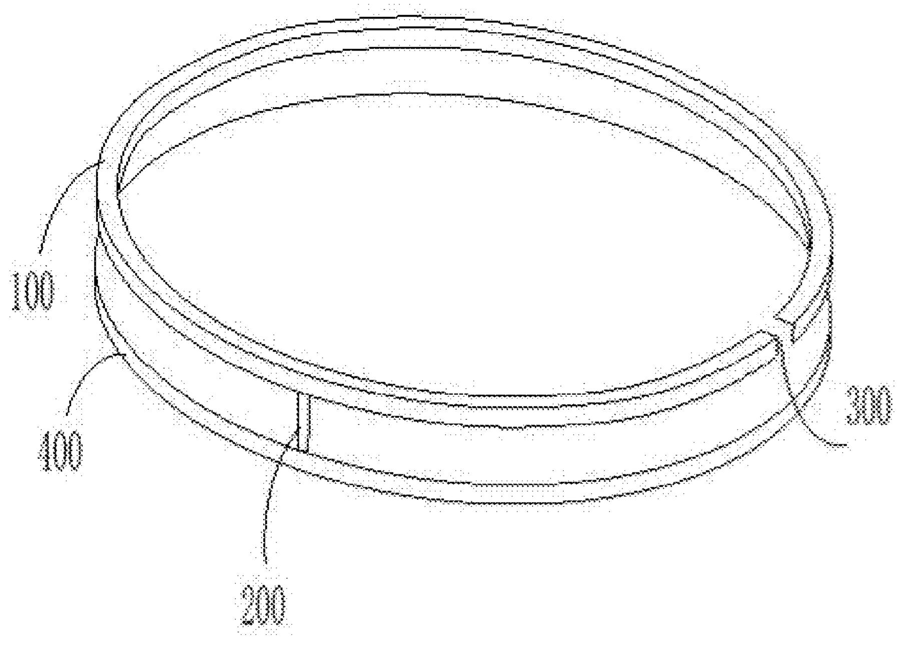
FIG. 2 is a structural schematic diagram of a single-frequency circularly polarized antenna provided in an embodiment of the present application.
Figure 3:
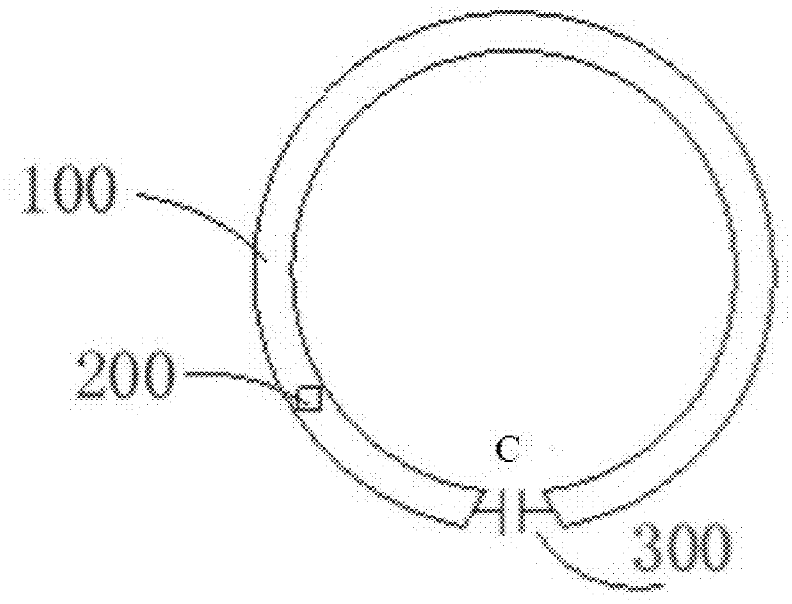
FIG. 3 is a top-view schematic diagram illustrating the single-frequency circularly polarized antenna provided in an embodiment of the present application.

In one embodiment, as shown in FIG. 2, a first circularly-polarized breakpoint 300 is arranged on the annular radiator 100 at a position where the resonant current weak zone 102 of the first mode overlaps with the resonant current strong zone 101 of the second mode or a position where the resonant current strong zone 101 of the first mode overlaps with the resonant current weak zone 102 of the second mode. A circular polarization capacitor C or a circular polarization inductor L is connected in series at the first circularly-polarized breakpoint 300. A feeding terminal 200 is provided at a feeding point which is located midway between a weakest point of resonant current in the first mode and an adjacent weakest point of resonant current in the second mode of the annular radiator 100. One end of the feeding terminal 200 is electrically connected to the radiator 100, and the other end of the feeding terminal 200 is electrically connected to a feeding module of the main board 400, thereby forming a single-frequency circularly polarized antenna. The top-view schematic diagram where a capacitor C is connected in series at the first circularly-polarized breakpoint 300 of the annular radiator 100 is illustrated in FIG. 3.

Figure 4:
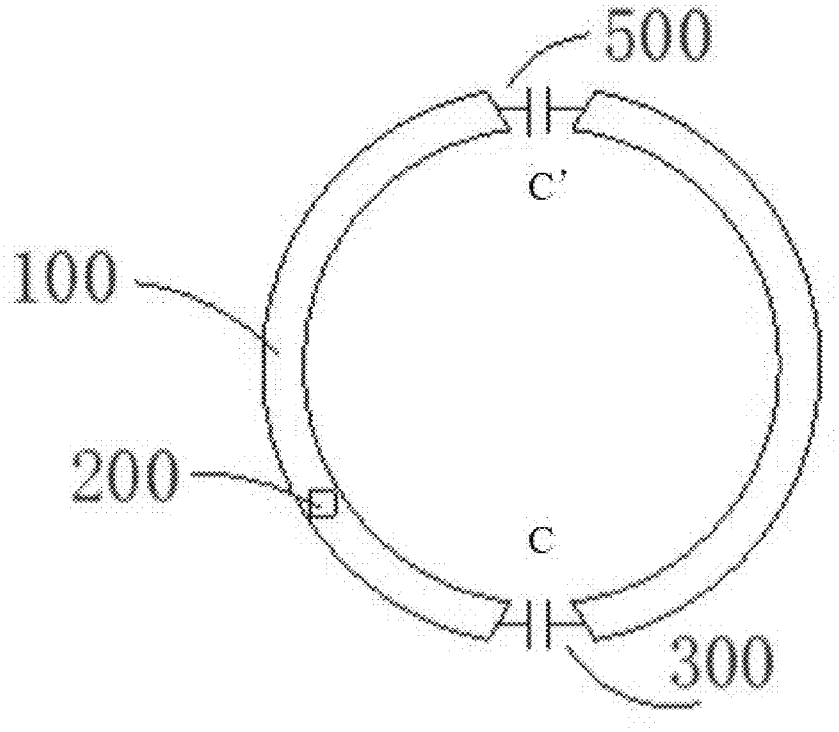
FIG. 4 is a top-view schematic diagram illustrating an annular radiator, where capacitors are respectively connected in series at a first circularly-polarized breakpoint and a second circularly-polarized breakpoint, provided in an embodiment of the present application.

In another embodiment, as shown in FIG. 4, another circular polarization breakpoint 500 is arranged on the circularly polarized antenna at another position where the resonant current weak zone 102 of the first mode overlaps with the resonant current strong zone 101 of the second mode or another position where the resonant current strong zone 101 of the first mode overlaps with the resonant current weak zone 102 of the second mode. A capacitor C' or an inductor L' is also connected in series at the other circular polarization breakpoint 500, thereby forming a dual-frequency circularly polarized antenna. FIG. 4 is a top-view schematic diagram illustrating the annular radiator 100 where a capacitor C is connected in series at the first circularly-polarized breakpoint 300 and a capacitor C' is connected in series at a second circularly-polarized breakpoint 500.

In one embodiment, the feeding point of the above embodiment is arranged at a position where the resonant current or electric field of the first mode and the resonant current or electric field of the second mode of the radiator 100 are substantially the same.

In another embodiment, the annular radiator has an annular slot structure. The slot structure includes an annular metal radiator, an effective circumferential length of the metal radiator is equal to one wavelength at the central operating frequency of the circularly polarized antenna; a feeding terminal bridging across the slot structure, one end of the feeding terminal is electrically connected to the metal radiator, and the other end of the feeding terminal is connected to the feeding module of the main board; and a grounding terminal bridging across s the slot structure, one end of the grounding terminal is electrically connected to the metal radiator, and the other end of the grounding terminal is electrically connected to a grounding module of the main board via an inductor or a capacitor, thereby forming a single-frequency circular polarization.

In another embodiment, the annular radiator has an annular slot structure. The slot structure includes an annular metal radiator, the effective circumferential length of the metal radiator is equal to one wavelength at the central operating frequency of the circularly polarized antenna; a feeding terminal bridging across the slot structure, one end of the feeding terminal is electrically connected to the metal radiator, and the other end of the feeding terminal is connected to the feeding module of the main board; and two grounding terminals, both of which are bridging across the slot structure, each of the two grounding terminals has one end being electrically connected to the metal radiator and another end being electrically connected to the grounding module of the main board via an inductor or capacitor, thereby forming a dual-frequency circular polarization.

The circularly polarized antenna provided according to a first aspect of the embodiments of the present application includes: a main board, an annular radiator, a feeding terminal and a frequency tunning component. The radiator is provided with an access portion. One end of the feeding terminal is electrically connected to the radiator at a feeding point, and the other end of the feeding terminal is electrically connected to the main board. The frequency tunning component is configured to adjust a frequency of a communication frequency band of the circularly polarized antenna. The frequency tunning component is electrically connected to the radiator at the access portion. Here, a line connecting the feeding point and a center point of the annular radiator is a first connecting line, a line connecting a center point of the access portion and the center point of the radiator is a second connecting line, and a counterclockwise circumferential direction around the radiator is a first direction. Along the first direction, the first connecting line including the feeding point and the second connecting line including the access portion form a first included angle, which is denoted by $\alpha$, and $\alpha \cup (80°, 100°) \cup (170°, 190°) \cup (260°, 280°)$. Due to that the grounding terminal or the breakpoint is arranged on the circularly polarized annular radiator at a position where a resonant current weak zone of the first mode overlaps with a resonant current strong zone of the second mode or a position where a resonant current strong zone of the first mode overlaps with a resonant current weak zone of the second mode. The feeding terminal is provided at a feeding point which is located midway between a weakest point of resonant current in the first mode and an adjacent weakest point of resonant current in the second mode of the circularly polarized annular radiator. The access portion is arranged at a position where the resonance current of the first mode is substantially the same as the resonance current of the second mode. The frequency tunning component is connected to the radiator via the access portion, and the frequency tunning component has the same tunning effect on the resonant frequency of the first mode and the resonant frequency of the second mode. Here, except for the position occupied by the feeding point, the access portion can be arranged at any position where the first included angle being (80°, 100°) or (170°, 190°) or (260°, 280°) on the annular radiator. Therefore, when the frequency tunning component adjusts the operating frequency of the circularly polarized antenna through the access portion at a position where the resonant current of the first mode is substantially the same as the resonant current of the second mode, a phase difference between the resonant phase of the first mode and the resonant phase of the second mode of the circularly polarized antenna is always maintained at 90°, which does not affect the formation of the circularly polarized antenna, thereby the adjustment complexity of the antenna's operating frequency is reduced and the adjustment efficiency of the antenna's operating frequency is improved.

The dual-frequency circularly polarized antenna provided according to a second aspect of the embodiments of the present application includes: a main board, an annular radiator, a feeding terminal, and an FM filter component. The radiator is provided with an access portion. One end of the feeding terminal is electrically connected to the radiator at a feeding point, and the other end of the feeding terminal is electrically connected to the main board. The FM filter component is electrically connected to the access portion. The FM filter component is configured to filter out signals in a second communication frequency band when adjusting a frequency of a first communication frequency band of the circularly polarized antenna; or alternatively, configured to filter out signals in the first communication frequency band when adjusting a frequency of the second communication frequency band of the circularly polarized antenna. Here, the feeding point and the access portion are respectively arranged at preset positions of the radiator. Due to that two grounding terminals or two breakpoints have been respectively arranged on the annular radiator at positions where the resonant current weak zone of the first mode overlaps with the resonant current strong zone of the second mode or the resonant current strong zone of the first mode overlaps with the resonant current weak zone of the second mode. The access portion and the feeding point are respectively arranged at the preset positions where the resonant current of the first mode is substantially the same as the resonant current of the second mode. The frequency tunning component is connected to the radiator via the access portion, and the frequency tunning component has the same tunning effect on the resonant frequency of the first mode and the resonant frequency of the second mode. Therefore, when the frequency tunning component adjusts the operating frequency of the circularly polarized antenna through the access portion at the position where the resonant current of the first mode is substantially the same as the resonant current of the second mode, the phase difference between the resonant phase of the first mode and the resonant phase of the second mode of the circularly polarized antenna is always maintained at 90°, which does not affect the formation of the dual-frequency circularly polarized antenna, thereby the adjustment complexity of the antenna's operating frequency is reduced and the adjustment efficiency of the antenna's operating frequency is improved.

Thus, the circularly polarized antenna provided in the embodiments of the present application is provided with an access portion is arranged at a preset position where the resonant current of the first mode is substantially the same as the resonant current of the second mode, and the frequency tunning component is connected to the radiator through the access portion. The frequency tunning component adjusts both the resonant frequency of the first mode and the resonant frequency of the second mode without affecting the formation of circular polarization of the antenna, which reduces the adjustment complexity of the antenna's operating frequency and improves the adjustment efficiency of the antenna's operating frequency. Additionally, since only a single annular radiator is required to achieve both frequency tuning and circularly polarized antenna functionality, the number of radiators is reduced, minimizing the spatial footprint of the circularly polarized antenna. This contributes to the compact design of terminal devices and enhances the satellite positioning performance of the terminal devices.

The technical schemes of the present application are illustrated below through specific embodiments.

Figure 5:
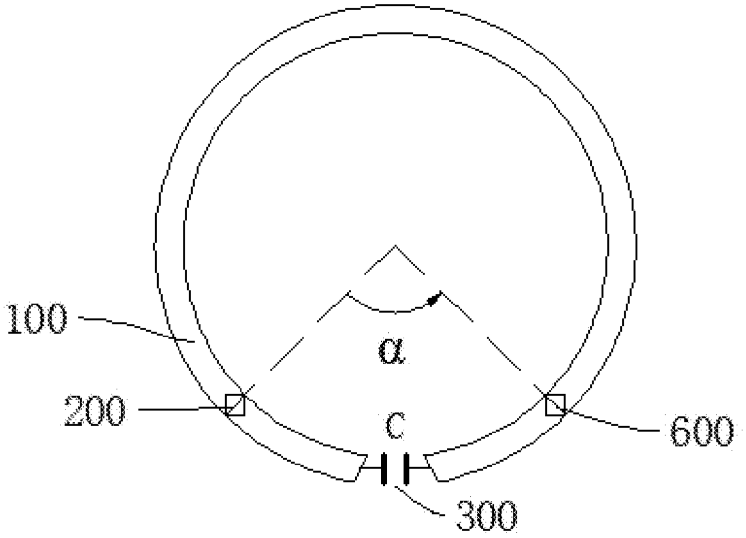
FIG. 5 is a top-view schematic diagram illustrating a first access portion of the annular radiator being positioned at a first included angle of 90° provided in an embodiment of the present application.

In the first aspect, as shown in FIG. 2 and FIG. 5, a circularly polarized antenna is provided in this embodiment, which includes: a main board 400; an annular radiator 100, the radiator being provided with a first access portion 600; a feeding terminal 200, one end of the feeding terminal 200 being electrically connected to the radiator 100 at a feeding point, and the other end of the feeding terminal 200 being electrically connected to the main board 400; and a frequency tunning component for adjusting the frequency of the communication frequency band of the circularly polarized antenna, the frequency tunning component being electrically connected to the radiator at the access portion. Here, a line connecting a center point of the feeding point and a center point of the annular radiator is a first connecting line, a line connecting the access portion and the center point of the radiator is a second connecting line, and the counterclockwise circumferential along the radiator is a first direction. The first connecting line including the feeding point and the second connecting line including the access portion form a first included angle along the first direction, and the first included angle is denoted by α, where $\alpha \cup (80°, 100°) \cup (170°, 190°) \cup (260°, 280°)$. FIG. 5 is a top-view schematic diagram illustrating the first access portion 600 of the annular radiator 100 being positioned at a first included angle of 90°.

In one embodiment, the first included angle includes any one of 90°, 180° or 270°. Since the annular radiator 100 has four positions where the resonance current of the first mode is substantially the same as the resonance current of the second mode, one of the four positions is provided with the feeding point, while the other three positions are sequentially arranged at positions with the first included angles being 90°, 180°, and 270°, respectively. At any of these angles 90°, 180° or 270°, the resonance current of the first mode is equal to the resonance current of the second mode. access portions are arranged at these three positions, and the frequency tunning component is electrically connected to the radiator at the access portion, which enhances the effect of adjusting the frequency of the communication frequency band of the circularly polarized antenna, and improves the efficiency of the frequency tunning component in adjusting the frequency of the communication frequency band of the circularly polarized antenna.

Figure 6:
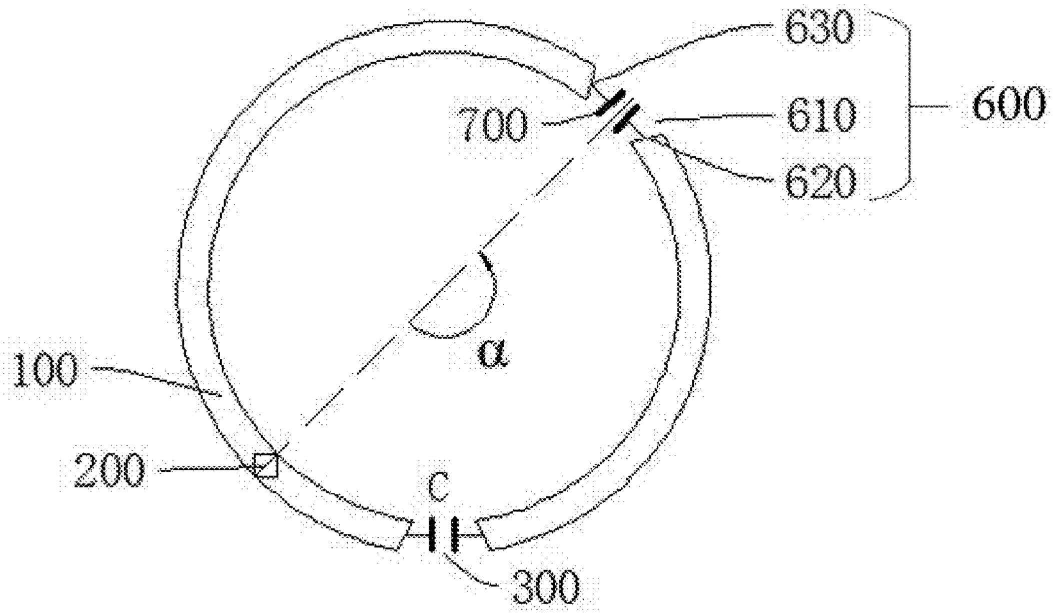
FIG. 6 is a top-view schematic diagram illustrating the first access portion of the annular radiator being positioned at a first included angle of 180° provided in an embodiment of the present application.

In one embodiment, as shown in FIG. 6, the radiator 100 is provided with a first breakpoint 610 in the first access portion 600, the first access portion 600 includes a first electrical coupling module 620 and a second electrical coupling module 630. The first electrical coupling module 620 and the second electrical coupling module 630 are respectively arranged at two opposite ends of the first breakpoint 610, one end of the frequency tunning component 700 is connected to the first electrical coupling module 620, and the other end of the frequency tunning component 700 is connected to the second electrical coupling module 630. Since the frequency tunning component is directly arranged at the first breakpoint, that is, the frequency tunning component and the radiator 100 are connected in series, thus, the occupied space of the antenna structure is reduced while maintaining the function of frequency tunning of the communication frequency band of the circularly polarized antenna. Further, the first included angle α∪(170°, 190°). Since the feeding point to which the feeding point terminal 200 is connected and the first access portion 600 are located at the diagonal of the annular radiator 100, the interference of the feeding point on the frequency tunning component is reduced, and the effect of adjusting the frequency of the communication frequency band of the circularly polarized antenna is further improved. FIG. 6 is a top-view schematic diagram illustrating the first access point 600 of the annular radiator 100 positioned at a first included angle of 180°.

In another embodiment, as shown in FIG. 5, the frequency tunning component 700 is connected to the radiator 100 through the first access portion 600, one end of the frequency tunning component 700 is electrically connected to the first access portion 600, and the other end is electrically connected to the main board 400. Further, the first included angle α520 (80°, 100°)∪(260°, 280°). Here, the frequency tunning component 700 is connected in parallel with the annular radiator 100, and FIG. 5 is top-view schematic diagram illustrating the first access portion 600 of the annular radiator 100 being positioned at a first included angle of 90°.

In some embodiments, the frequency tunning component 700 includes either a first capacitor C1 or a first inductor L1, or both the first capacitor C1 and the first inductor L1. Since either the capacitor or the inductor, or both the capacitor and the inductor can alter the effective length of the ring radiator, the operating center frequency of the circularly polarized antenna shifts synchronously, thereby the tunning of the operating frequency of the circularly polarized antenna is achieved.

In some embodiments, the frequency tunning component 700 consists of a first capacitor C1, and the first capacitor C1 is connected in series with the radiator 100, that is, the first capacitor C1 is connected in series to the first access portion 600. The equivalent distributed inductance of radiator 100 decreases due to an offset effect of capacitor, thereby reducing the effective length (also known as effective electrical length) of radiator 100. The resonant frequency of radiator 100 is inversely proportional to the effective length of the radiator 100, that is, the smaller the effective length, the higher the resonant frequency. Therefore, the resonant frequency of the first mode and the resonant frequency of the second mode of the radiator 100 are both increased. The first capacitor C1 is at a position where the resonant current of the first mode is substantially the same as the resonant current of the second mode, so that the frequency tunning component 700, when consisted of the first capacitor C1 and connected in series with the radiator 100, can adjust both the resonant frequency of the first mode and the resonant frequency of the second mode of the radiator 100, that is, adjust the operating frequency of the circularly polarized antenna.

In some embodiments, the frequency tunning component 700 consists of a first capacitor C1, and the first capacitor C1 is connected in parallel with the radiator 100, that is, one end of the first capacitor C1 is electrically connected to the first access portion 600, and the other end of the first capacitor C1 is electrically connected to the main board 400. The equivalent distributed inductance of radiator 100 increases due to the capacitor connected in parallel, thereby enlarging the effective length (also known as effective electrical length) of radiator 100. The resonant frequency of radiator 100 is inversely proportional to its effective length, that is, the greater the effective length, the lower the resonant frequency. Therefore, the resonant frequency of the first mode and the resonant frequency of the second mode of the radiator 100 are both reduced. The first capacitor C1 is at a position where the resonant current of the first mode is substantially the same as the resonant current of the second mode, so the frequency tunning component 700, when consisted of the first capacitor C1 and connected in parallel with the radiator 100, can adjust both the resonant frequency of the first mode and the resonant frequency of the second mode of the radiator 100, that is, adjust the operating frequency of the circularly polarized antenna.

In some embodiments, the frequency tunning component 700 consists of a first inductor L1, and the first inductor L1 is connected in series with the radiator 100, that is, the first inductor L1 is connected in series to the first access portion 600. The equivalent distributed inductance of the radiator 100 increases due to an enhancement effect of the inductor connected in series, thereby enlarging the effective length (also known as the effective electrical length) of the radiator 100. The resonant frequency of the radiator 100 is inversely proportional to the effective length of the radiator 100, that is, the greater the effective length, the lower the resonant frequency, thus, the resonant frequency of the first mode and the resonant frequency of the second mode of the radiator 100 are both reduced. The first inductor L1 is at a position where the resonant current of the first mode and the resonant current of the second mode are substantially the same, so that the frequency tunning component 700, when consisted of the first inductor L1 and connected in series with the radiator 100, can adjust both the resonant frequency of the first mode and the resonant frequency of the second mode of the radiator 100, that is, adjust the operating frequency of the circularly polarized antenna.

In some embodiments, the frequency tunning component 700 consists of a first inductor L1, and the first inductor L1 is connected in parallel with the radiator 100, that is, one end of the first inductor L1 is electrically connected to the first access portion 600, and the other end of the first inductor L1 is electrically connected to the main board 400. The equivalent distributed inductance of the radiator 100 is reduced due to an offset effect of the inductor connected in series, thereby reducing the effective length (also known as the effective electrical length) of the radiator 100. The resonant frequency of the radiator 100 is inversely proportional to the effective length of the radiator 100, that is, the smaller the effective length, the higher the resonant frequency, thus, the resonant frequency of the first mode and the resonant frequency of the second mode of the radiator 100 are both increased. The first inductor L1 is at a position where the resonant current of the first mode is substantially the same as the resonant current of the second mode, so that the frequency tunning component 700, when consisted of the first inductor L1 and connected in parallel with the radiator 100, can adjust both the resonant frequency of the first mode and the resonant frequency of the second mode of the radiator 100, that is, adjust the operating frequency of the circularly polarized antenna.

Figure 7:
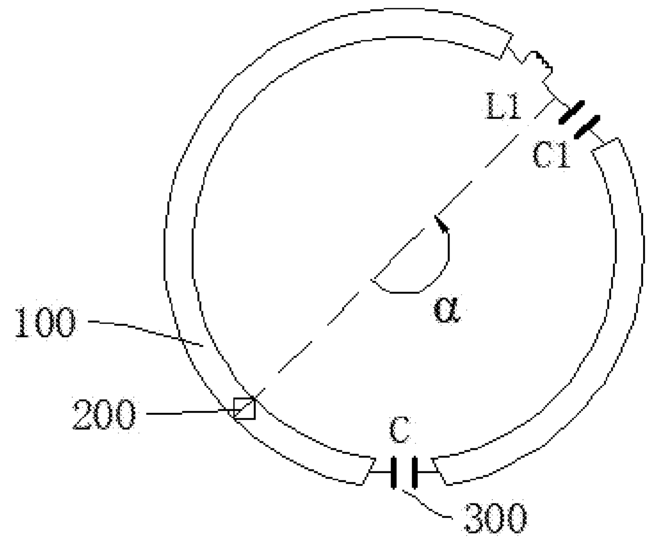
FIG. 7 is a top-view schematic diagram illustrating that a frequency tunning component, which includes a first capacitor and a first inductor, is positioned at the first included angle of 180°, provided in an embodiment of the present application.

In some embodiments, as shown in FIG. 7, the frequency tunning component 700 consists of a first capacitor C1 and a first inductor L1. One end of the first capacitor C1 is connected to the radiator 100, the other end of the first capacitor C1 is connected to one end of the first inductor L1, and the other end of the first inductor L1 is connected to the radiator 100. The first capacitor C1 and the first inductor L1 are connected in series with the radiator. Since the first capacitor C1 connected in series can increase the operating frequency of the circularly polarized antenna, and the first inductor L1 connected in series can reduce the operating frequency of the circularly polarized antenna, the determination of whether the operating frequency of the circularly polarized antenna increases or decreases depends on the values of the first capacitor C1 and the first inductor L1.

Figure 8:
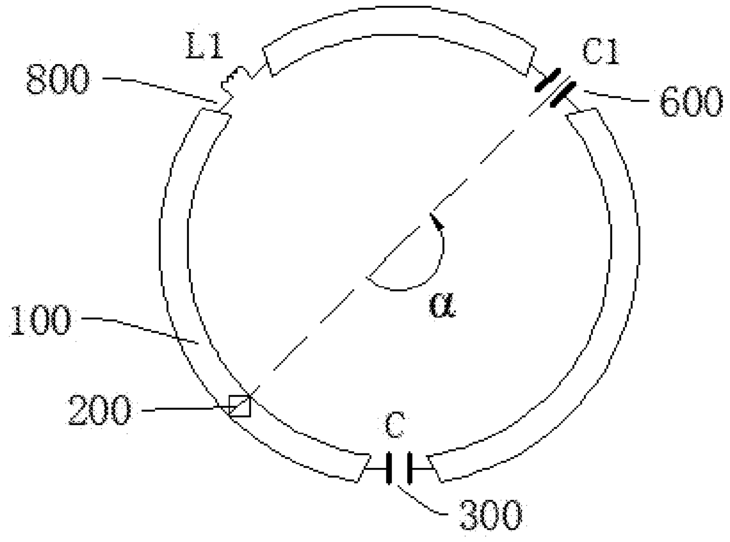
FIG. 8 is a top-view schematic diagram illustrating that a first inductor is connected in series to a second access portion and a first capacitor connected in series to the first access portion provided in an embodiment of the present application.

In some embodiments, as shown in FIG. 8, the annular radiator 100 is also provided with a second access portion 800, and the second access portion 800 is also located at any position where the resonant current of the first mode is substantially the same as the resonant current of the second mode. The frequency tunning component 700 consists of a first capacitor C1 and a first inductor L1, and a second breakpoint is provided at the second access portion 800. The first capacitor C1 is connected in series to the first access portion 600 and the first inductor L1 is connected in series to the second access portion 800, or alternatively, the first capacitor C1 is connected in series to the second access portion 800 and the first inductor L1 is connected in series to the first access portion 600. Since the first capacitor C1 connected in series can increase the operating frequency of the circularly polarized antenna, and the first inductor L1 connected in series can reduce the operating frequency of the circularly polarized antenna, the operating frequency of the circularly polarized antenna is determined to be increased or decreased according to the values of the first capacitor C1 and the first inductor L1. FIG. 8 is a top-view schematic diagram illustrating that the first capacitor C1 is connected in series to the first access portion 600 access portion and the first inductor L1 is connected in series to the second access portion 800 access portion.

Figure 9:
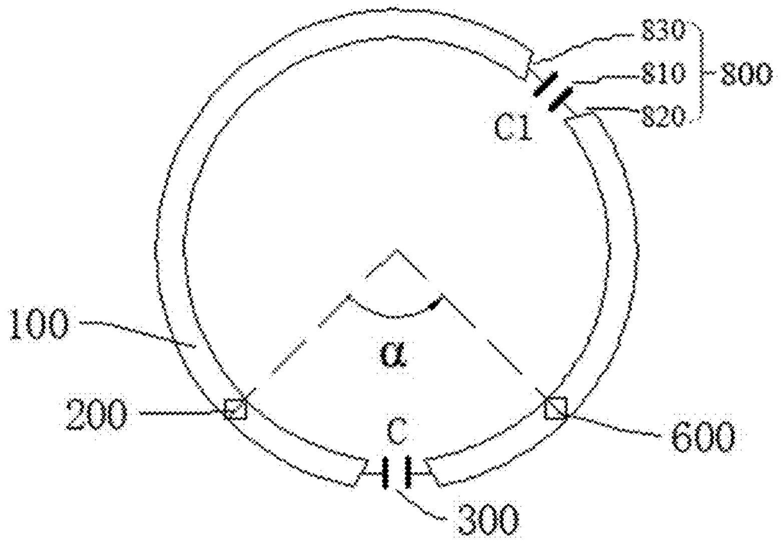
FIG. 9 is a top-view schematic diagram illustrating that the first access portion is located at the position with the first included angle being 90°, and a second access portion located at the position with the first included angle being 180°, provided in an embodiment of the present application.

In some embodiments, as shown in FIG. 9, the annular radiator 100 is provided with a first access portion 600, the annular radiator 100 is further provided with a second access portion 800, and a breakpoint is provided at the second access portion 800. The second access portion 800 is also located at any position where the resonant current of the first mode is substantially the same as the resonant current of the second mode. The frequency tunning component 700 includes a first frequency tunning component and a second frequency tunning component, the first frequency tunning component is a first capacitor C1 and the second frequency tunning component is a first inductor L1. Here, the first capacitor C1 is connected in series at the breakpoint of the second access portion 800, one end of the first inductor L1 is electrically connected to the first access portion 600, and the other end of the first inductor L1 is electrically connected to the main board 400 (not shown), that is, the first capacitor C1 (i.e., the first frequency tunning component) is connected in series with the radiator 100, and the first inductor L1 (i.e., the second frequency tunning component) is connected in parallel with the radiator 100. Since the first capacitor C1 connected in series can increase the operating frequency of the circularly polarized antenna, and the first inductor L1 connected in parallel can also increase the operating frequency of the circularly polarized antenna, an increase in the operating frequency of the circularly polarized antenna is determined based on the values of the first capacitor C1 and the first inductor L1.

In other embodiments, the annular radiator 100 is provided with a first access portion 600, and a breakpoint is provided at the first access portion 600, the annular radiator 100 is further provided with a second access portion 800. The second access portion 800 is also located at any position where the resonant current of the first mode is substantially the same as the resonant current of the second mode. The frequency tunning component 700 includes a first frequency tunning component and a second frequency tunning component, the first frequency tunning component is a first capacitor C1 and the second frequency tunning component is a first inductor L1. Here, the first inductor L1 is connected in series at the breakpoint of the first access portion 600, one end of the first capacitor C1 is electrically connected to the second access portion 800, and the other end of the first capacitor C1 is electrically connected to the main board 400, that is, the first inductor L1 (i.e., the second frequency tunning component) is connected in series with the radiator 100 (not shown), and the first capacitor C1 (i.e., the first frequency tunning component) is connected in parallel with the radiator 100. Since the first capacitor C1 connected in parallel can reduce the operating frequency of the circularly polarized antenna, and the first inductor L1 connected in series can also reduce the operating frequency of the circularly polarized antenna, a reduction in the operating frequency of the circularly polarized antenna is determined based on the values of the first capacitor C1 and the first inductor L1. FIG. 9 is a top-view schematic diagram illustrating the first access portion 600 being located at the first included angle of 90° and the second access portion 800 being located at the first included angle of 180°.

As described above, when the annular radiator 100 is connected in parallel with the first capacitor C1 or in series with the first inductor L1, or when the annular radiator 100 is connected in parallel with the first capacitor C1 and in series with the first inductor L1, the resonant frequency of the first mode and the resonant frequency of the second mode of the annular radiator 100 can both be reduced. When the annular radiator 100 is connected in series with the first capacitor C1 or in parallel with the first inductor L1, or when the annular radiator 100 is connected in series with the first capacitor C1 and in parallel with the first inductor L1, the resonant frequency of the first mode and the resonant frequency of the second mode of the annular radiator 100 can both be increased. Thereby, the operating frequency of the circularly polarized antenna can be adjusted.

In some embodiments, the frequency tunning component 700 includes either multiple capacitors or multiple inductors L1, or both the multiple capacitors and the multiple inductors. The principle is similar to the above embodiment. Since either the capacitors or the inductors, or both the capacitors and the inductors can alter the effective length of the annular radiator, the operating center frequency of the circularly polarized antenna shifts synchronously, thereby the tunning of the operating frequency of the circularly polarized antenna can be achieved.

In some embodiments, the center frequencies of the Bluetooth antenna and the WIFI antenna are the same, both of which are about 2.45 GHz. The center frequency of the GPS signal in the L1 band of the satellite positioning GPS antenna is about 1.575 GHz, and the center frequency of the GPS signal in the L5 band is about 1.176 GHZ. By adjusting the capacitance or inductance values of the frequency tuning component, the original antenna's frequency can be increased or decreased to match the target antenna's center operating frequency.

In some embodiments, the antenna is capable of exciting or receiving signals with frequencies that are harmonic multiples of one another. For example, the antenna can excite or receive signals in the f0 frequency band, the 2f0 frequency band, and the 3f0 frequency band. Specifically, the frequency of Bluetooth or Wi-Fi signals is approximately twice that of the L5 band GPS signal. Therefore, when the circularly polarized antenna is capable of exciting or receiving the L5 band GPS signal, the circularly polarized antenna can also simultaneously receive Bluetooth or Wi-Fi signals.

Figure 10:
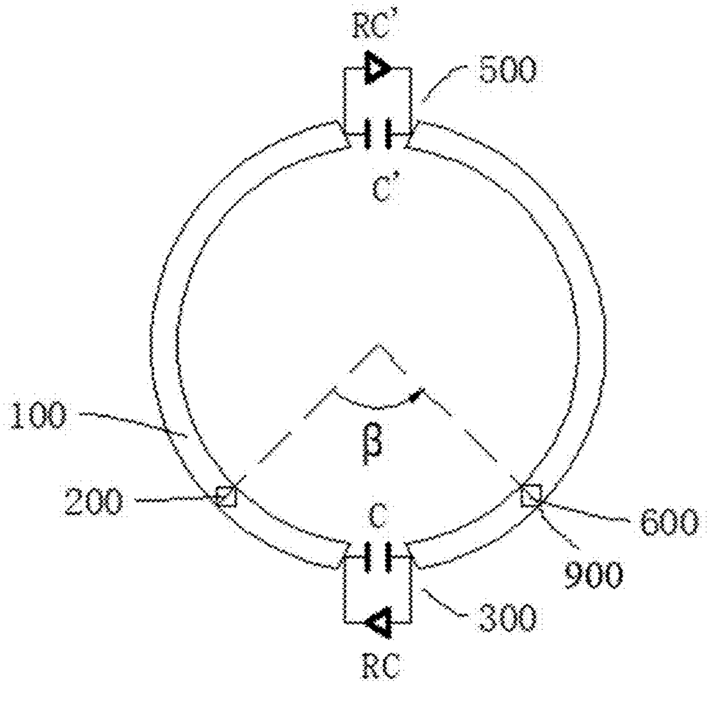
FIG. 10 is a top-view schematic diagram illustrating that a first circular polarization capacitor is located at the first circularly-polarized breakpoint and a second circular polarization capacitor located at the second circularly-polarized breakpoint, and the feeding point and the first access portion are respectively located at preset positions, provided in an embodiment of the present application.

In the second aspect, as shown in FIG. 2 and FIG. 10, a dual-frequency circularly polarized antenna is provided in this embodiment, which includes a main board 400, an annular radiator 100, a feeding terminal 200, and an FM filter component 900. The radiator is provided with a first access portion 600. One end of the feeding terminal 200 is electrically connected to the radiator 100 at a feeding point, and the other end of the feeding terminal 200 is electrically connected to the main board 400. The FM filter component 900 is electrically connected to the first access portion 600, and the FM filter component 900 is configured to filter out signals in a second communication frequency band when adjusting a frequency of a first communication frequency band of the circularly polarized antenna; or alternatively, configured to filter out signals in the first communication frequency band when adjusting a frequency of the second communication frequency band of the circularly polarized antenna. Here, the feeding point and the first access portion 600 are respectively arranged at preset positions of the radiator. The first circular polarization capacitor C has been connected with the annular radiator 100 at the first circularly-polarized breakpoint 300, and a first circular polarization filter RC is also connected in series at the first circularly-polarized breakpoint 300. The first circular polarization capacitor C and the first circular polarization filter RC are connected in parallel. A second circular polarization capacitor C' has been connected in series at a second circularly-polarized breakpoint 500, a second circular polarization filter RC' is also connected in series at the second circularly-polarized breakpoint 500. The second circular polarization capacitor C' and the second circular polarization filter RC' are connected in parallel. FIG. 10 is a top-view schematic diagram illustrating that the first circular polarization capacitor C is located at the first circularly-polarized breakpoint 300 and the second circular polarization capacitor C' is located at the second circularly-polarized breakpoint 500, and the feeding point and the first access portion 600 are respectively located at preset positions. Here, the signals in the first communication frequency band correspond to the operating frequency band signals of the circularly polarized antenna formed by the feeding terminal 200, the radiator 100 and the first circular polarization capacitor C, and the signals in the second communication frequency band correspond to the operating frequency band signals of the circularly polarized antenna formed by the feeding terminal 200, the radiator 100 and the second circular polarization capacitor C'. Or alternatively, the signals in the first communication frequency band correspond to the operating frequency band signals of the circularly polarized antenna formed by the feeding terminal 200, the radiator 100 and the second circular polarization capacitor C', and the signals in the second communication frequency band correspond to the operating frequency band signals of the circularly polarized antenna formed by the feeding terminal 200, the radiator 100 and the first circular polarization capacitor C.

In one embodiment, the circularly polarized antenna also includes signals in a third communication frequency band, and the signals in the third communication frequency band are signals outside the first and second communication frequency bands. The FM filter component 900 is also configured to filter out signals in the third communication frequency band when filtering out the signals in the first communication frequency band or the signals in the second communication frequency band. The signals in the third communication frequency band correspond to the operating frequency band signals of the circularly polarized antenna formed by the feeding terminal 200, the radiator 100, the first circular polarization capacitor C and the second circular polarization capacitor C'.

In one embodiment, the first resonant current and the second resonant current at the preset positions are substantially the same. Here, the first resonant current is the resonant current of the radiator in the first mode, and the second resonant current is the resonant current of the radiator in the second mode, which facilitates the FM filter component to adjust the operating frequency of a multi-frequency circularly polarized antenna.

In one embodiment, the first connecting line including the feed point and the second connecting line including the access portion form a second included angle along the first direction. The first connecting line is defined as the line connecting the feed point and the center point of the annular radiator. The second connecting line is defined as the line connecting the center point of the access portion and the center point of the radiator. The first direction refers to the counterclockwise circumferential direction along the radiator. The second included angle is denoted by β, where $\beta \cup (80^\circ, 100^\circ) \cup (170^\circ, 190^\circ) \cup (260^\circ, 280^\circ)$. Preferably, the second included angle includes any one of 90°, 180° or 270°. Since the annular radiator 100 has four positions where the resonance current of the first mode is substantially the same as the resonance current of the second mode, one of the four positions is provided with the feeding point, while the other three positions are sequentially arranged at positions with the second included angle s being 90°, 180°, and 270°, respectively. At any of these angles 90°, 180° or 270°, the resonance current of the first mode is equal to the resonance current of the second mode. access portions are arranged at these three positions, and the frequency tunning component is electrically connected to the radiator at the access portion, which enhances the effect of adjusting the frequency of the communication frequency band of the circularly polarized antenna, and improves the efficiency of the frequency tunning component in adjusting the frequency of the communication frequency band of the circularly polarized antenna.

In one embodiment, the FM filter component 900 includes a first FM filter component 910. The first FM filter component 910 is configured to filter out signals in the second communication frequency band when adjusting the frequency of the first communication frequency band of the circularly polarized antenna. Or alternatively, the first FM filter component 910 is configured to filter out signals in the first communication frequency band when adjusting the frequency of the second communication frequency band of the circularly polarized antenna, such that the first FM filter component can not only filter out the unnecessary frequency bands, but also adjust the operating frequency band of the multi-frequency circularly polarized antenna.

In one embodiment, the first FM filter component 910 includes a first frequency modulation element 911 and a first filter element 912. The first frequency modulation element 911 is configured to adjust the frequency of the first communication frequency band of the circularly polarized antenna, and the first filter element 912 is configured to filter out signals in the second communication frequency band. Or alternatively, the first frequency modulation element 911 is configured to adjust the frequency of the second communication frequency band of the circularly polarized antenna, and the first filter element 912 is configured to filter out signals in the first communication frequency band. The frequency modulation element and the filter element are separated to avoid mutual interference, which can not only filter out the unnecessary frequency band, but also adjust the operating frequency band of the multi-frequency circularly polarized antenna, thereby improving the frequency tunning and filtering efficiency of the multi-frequency circularly polarized antenna.

In one embodiment, the FM filter component further includes a second FM filter component 920. If the first FM filter component 910 is configured to adjust the frequency of the first communication frequency band of the circularly polarized antenna and filter out signals in the second communication frequency band, then the second FM filter component 920 is configured to filter out signals in the first communication frequency band when adjusting the frequency of the second communication frequency band of the circularly polarized antenna. If the first FM filter component 910 is configured to adjust the frequency of the second communication frequency band of the circularly polarized antenna and filter out signals in the first communication frequency band, then the second FM filter component 920 is configured to filter out signals in the second communication frequency band when adjusting the frequency of the first communication frequency band of the circularly polarized antenna, so that the second FM filter component can not only filter for a specific target frequency band but also adjust the target operating frequency band of the multi-frequency circularly polarized antenna.

In one embodiment, the second FM filter component 920 includes a second frequency modulation element 921 and a second filter element 922. The second frequency modulation element 921 is configured to adjust the signals in the first communication frequency band, and the second filter element 922 is configured to filter out the signals in the second communication frequency band. Or alternatively, the second frequency modulation element 921 is configured to adjust the signals in the second communication frequency band, and the second filter element 922 is configured to filter out the signals in the first communication frequency band, and the frequency modulation element and the filter element are separated to avoid mutual interference, which can not only filter for a specific target frequency band, but also adjust the target operating frequency band of the multi-frequency circularly polarized antenna, thereby improving the frequency tunning and filtering efficiency of the multi-frequency circularly polarized antenna.

In one embodiment, the radiator 100 is provided with a first breakpoint 610 at the first access portion 600, and the first access portion 600 includes a first electrical coupling module 620 and a second electrical coupling module 630, and the first electrical coupling module 620 and the second electrical coupling module 630 are respectively arranged at opposite ends of the first breakpoint 610, to facilitate the first access portion 600 to access the FM filter component.

In one embodiment, the first frequency modulation element 911 is either a first capacitor C1 or a first inductor L1, or both the first capacitor C1 and the first inductor L1, and the second frequency modulation element 921 is either a second capacitor C2 or a second inductor L2, or both the second capacitor C2 and the second inductor L2. The first filter element 912 is a first filter RC1, and the second filter element 922 is a second filter RC2.

Figure 11:
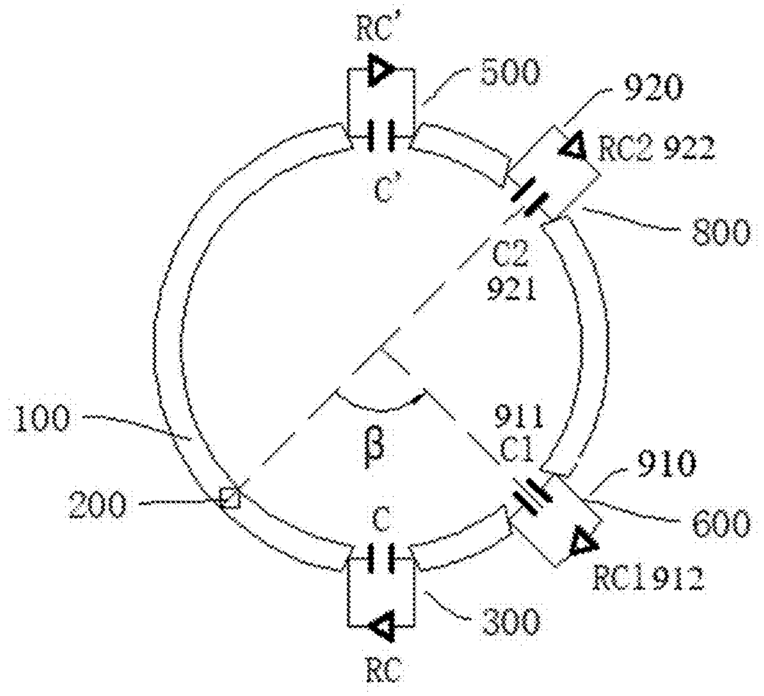
FIG. 11 is a top-view schematic diagram illustrating that a first FM filter component is connected in series to the first access portion, and a second FM filter component is connected in series to the second access portion, provided in an embodiment of the present application.

In one embodiment, as shown in FIG. 11, the first FM filter component 910 is connected in series at the first breakpoint 610 of the first access portion 600, a first end of the first FM filter component 910 is electrically connected to the first electrical coupling module 620, and a second end of the first FM filter component 910 is electrically connected to the second electrical coupling module 630. Here, a first end of the first frequency modulation element 911 is electrically connected to the first electrical coupling module 620 and a first end of the first filter element 912. A second end of the first frequency modulation element 911 is electrically connected to the second electrical coupling module 630 and a second end of the first filter element 912. Since the first FM filter component 910 is directly arranged at the first breakpoint 610, that is, the first FM filter component 910 is connected in series with the radiator 100, the occupied space of the antenna structure is reduced while ensuring the frequency adjustment on the communication frequency band of the circularly polarized antenna.

In one embodiment, as shown in FIG. 11, the radiator 100 is further provided with a second access portion 800, at which a second breakpoint 810 is provided. The second access portion 800 includes a third electrical coupling module 820 and a fourth electrical coupling module 830, which are respectively arranged at two opposite ends of the second breakpoint 810. A first end of the second FM filter component 920 is electrically connected to the third electrical coupling module 820, and a second end of the second FM filter component 920 is electrically connected to the fourth electrical coupling module 830. Here, the first access portion 600 is located at a position where the second included angle is 90°, and the second access portion 800 is located at a position where the second included angle is 180°. A first end of the second frequency modulation element 921 is electrically connected to the third electrical coupling module and a first end of the second filter element 922. A second end of the second frequency modulation element 921 is electrically connected to the fourth electrical coupling module and a second end of the second filter element 922. The first FM filter component 910 is connected in series with the radiator 100 at the first access portion 600, and the second FM filter component 920 is connected in series with the radiator 100 at the second access portion 800, to collectively adjust the operating frequency of the dual-frequency circularly polarized antenna, and filter out the signals in the target frequency band. Among them, FIG. 11 is a top-view schematic diagram illustrating that the first FM filter component 910 is connected in series to the first access portion 600 and the second FM filter component 920 is connected in series to the second access portion 800.

In one embodiment, as shown in FIG. 11, the first FM filter component 910 is connected in series at the first breakpoint 610 of the first access portion 600, the first frequency modulation element 911 is the first capacitor C1, and the first filter element 912 is the first filter RC1. The second FM filter component 920 is connected in series at the second breakpoint 810 of the second access portion 800, the second frequency modulation element 921 is the second capacitor C2, and the second filter element 922 is the second filter RC2. Among them, if the first capacitor C1 is configured to adjust the frequency of the first communication frequency band of the circularly polarized antenna, and the first filter RC1 is configured to filter out the signals in the second communication frequency band, then the second capacitor C2 is configured to adjust the frequency of the second communication frequency band of the circularly polarized antenna, and the second filter RC2 is configured to filter out the signals in the first communication frequency band. Since the first capacitor C1 is connected in series at the first breakpoint 610, the first capacitor C1 is connected in series with the radiator 100, and since the second capacitor C2 is connected in series at the second breakpoint 810, the second capacitor C2 is also connected in series with the radiator 100. According to the principle elaborated in the foregoing embodiments, the first capacitor C1 will cause an increase in frequency of the first communication frequency band of the circularly polarized antenna, and the second capacitor C2 will also cause an increase in frequency of the second communication frequency band of the circularly polarized antenna. Or alternatively, if the first capacitor C1 is configured to adjust the frequency of the second communication frequency band of the circularly polarized antenna, and the first filter RC1 is configured to filter out the signals in the first communication frequency band, then the second capacitor C2 is configured to adjust the frequency of the first communication frequency band of the circularly polarized antenna, and the second filter RC2 is configured to filter out the signals in the second communication frequency band. According to the principle elaborated in the foregoing embodiments, the first capacitor C1 will cause an increase in the frequency of the second communication frequency band of the circularly polarized antenna, and the second capacitor C2 will also cause an increase in the frequency of the first communication frequency band of the circularly polarized antenna.

In one embodiment, the first FM filter component 910 is connected in series at the first breakpoint 610 of the first access portion 600, and the second FM filter component 920 is connected in series at the second breakpoint 810 of the second access portion 800. The first FM filter component 910 and the second FM filter component 920 may also be the first inductor L1 and second inductor L2, respectively. According to the principle elaborated in the foregoing embodiments, the frequency tunning of the circularly polarized antenna through the first inductor L1 and the second inductor L2 will both result in a decrease in frequency of the circularly polarized antenna.

In one embodiment, the first FM filter component 910 is connected in series at the first breakpoint 610 of the first access portion 600, and the second FM filter component 920 is connected in series at the second breakpoint 810 of the second access portion 800. The first FM filter component 910 may also be the first inductor L1 and the second FM filter component 920 may also be the second capacitor C2, or alternatively, the first FM filter component 910 may also be the first capacitor C1 and the second FM filter component 920 may also be the second inductor L2. According to the principle elaborated in the foregoing embodiments, the frequency of the circularly polarized antenna can be adjusted to reduce or increase through the first inductor L1 and the second capacitor C2, or the first capacitor C1 and the second inductor L2. Whether the frequency of the circularly polarized antenna is reduced or increased is determined based on the values of the capacitors or inductors.

Figure 12:
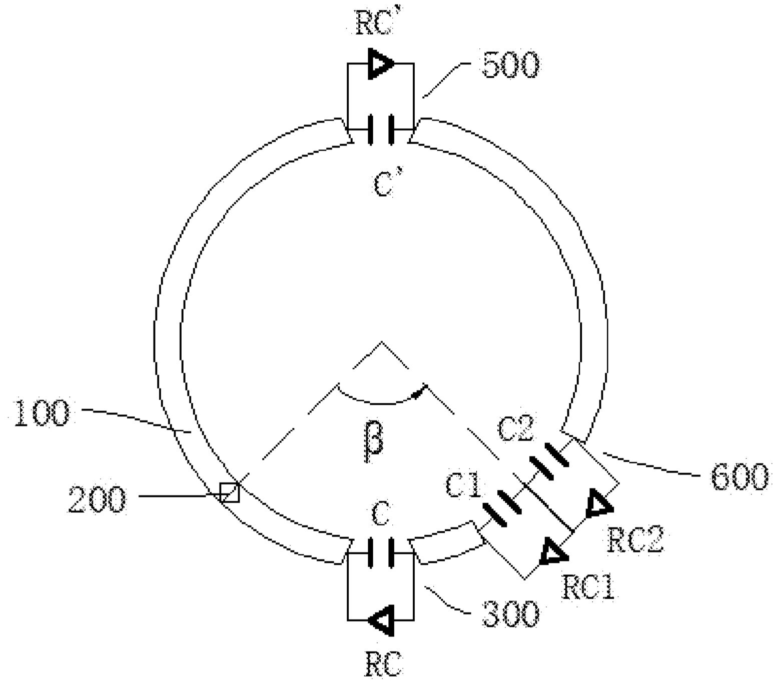
FIG. 12 is a top-view schematic diagram illustrating that the first FM filter component and the second FM filter component are connected in series and then connected in series at the first breakpoint of the first access portion, provided in an embodiment of the present application.

In one embodiment, as shown in FIG. 12, the first FM filter component 910 and the second FM filter component 920 are connected in series and then connected in series at the first breakpoint 610 of the first access portion 600, the first end of the first FM filter component 910 is electrically connected to the first electrical coupling module 620, the second end of the first FM filter component 910 is electrically connected to the first end of the second FM filter component 920, and the second end of the second FM filter component 920 is electrically connected to the second electrical coupling module 630. Here, the first end of the first frequency modulation element 911 is electrically connected to the first electrical coupling module 620 and the first end of the first filter element 912. The second end of the first frequency modulation element 911 is electrically connected to the first filter element 912, the first end of the second frequency modulation element 921, and the first end of the second filter element 922. The second end of the second frequency modulation element 921 is electrically connected to the second end of the second filter element 922 and the second electrical coupling module 630. The first FM filter component 910 and the second FM filter component 920 are connected in series with the radiator 100 at the first access portion 600 or the second access portion 800, to adjust the operating frequency of the dual-frequency circularly polarized antenna, and filter out the signals in the target frequency band. FIG. 12 is a top-view schematic diagram illustrating that the first FM filter component 910 and the second FM filter component 920 are connected in series and then connected in series at the first breakpoint 610 of the first access portion 600.

In one embodiment, as shown in FIG. 12, the first FM filter component 910 and the second FM filter component 920 are connected in series and then connected in series at the first breakpoint 610 of the first access portion 600. The first frequency modulation element 911 is the first capacitor C1, the first filter element 912 is the first filter RC1, the second frequency modulation element 921 is the second capacitor C2, and the second filter element 922 is the second filter RC2. Here, the first end of the first capacitor C1 is electrically connected to the first electrical coupling module 620 and the first end of the first filter RC1. The second end of the first capacitor C1 is electrically connected to the second end of the first filter RC1, the first end of the second capacitor C2, and the first end of the second filter RC2. The second end of the second capacitor C2 is electrically connected to the second end of the second filter RC2 and the second electrical coupling module 630. If the first capacitor C1 is configured to adjust the frequency of the first communication frequency band of the circularly polarized antenna and the first filter RC1 is configured to filter out the signals in the second communication frequency band, then the second capacitor C2 is configured to adjust the frequency of the second communication frequency band of the circularly polarized antenna and the second filter RC2 is configured to filter out the signals in the first communication frequency band. Since the first capacitor C1 and the second capacitor C2 are first connected in series and then connected in series at the first breakpoint 610, the first capacitor C1 and the second capacitor C2 are both connected in series with the radiator 100. According to the principle elaborated in the foregoing embodiments, the first capacitor C1 will cause an increase in frequency of the first communication frequency band of the circularly polarized antenna, and the second capacitor C2 will also cause an increase in frequency of the second communication frequency band of the circularly polarized antenna. Or alternatively, if the first capacitor C1 is configured to adjust the frequency of the second communication frequency band of the circularly polarized antenna, and the first filter RC1 is configured to filter out the signals in the first communication frequency band, then the second capacitor C2 is configured to adjust the frequency of the first communication frequency band of the circularly polarized antenna, and the second filter RC2 is configured to filter out the signals in the second communication frequency band. According to the principle elaborated in the foregoing embodiments, the first capacitor C1 will cause an increase in the frequency of the second communication frequency band of the circularly polarized antenna, and the second capacitor C2 will also cause an increase in the frequency of the first communication frequency band of the circularly polarized antenna.

In one embodiment, the first FM filter component 910 and the second FM filter component 920 are connected in series and then connected in series at the first breakpoint 610 of the first access portion 600. The first frequency modulation element 911 may also be the first inductor L1, and the second frequency modulation element 921 may also be the second inductor L2. According to the principle elaborated in the foregoing embodiments, the frequency tunning of the circularly polarized antenna through the first inductor L1 and the second inductor L2 will both result in a decrease in the frequency of the circularly polarized antenna.

In one embodiment, the first FM filter component 910 and the second FM filter component 920 are connected in series and then connected in series at the first breakpoint 610 of the first access portion 600. Here, the first frequency modulation element 911 may also be the first inductor L1 and the second frequency modulation element 921 may also be the second capacitor C2, or alternatively, the first frequency modulation element 911 may also be the first capacitor C1, and the second frequency modulation element 921 may also be the second inductor L2. According to the principle elaborated in the foregoing embodiments, the frequency of the circularly polarized antenna can be adjusted to reduce or increase through the first inductor L1 and the second capacitor C2, or the first capacitor C1 and the second inductor L2. Whether the frequency of the circularly polarized antenna is reduced or increased is determined based on the values of the capacitors or inductors.

Figure 13:
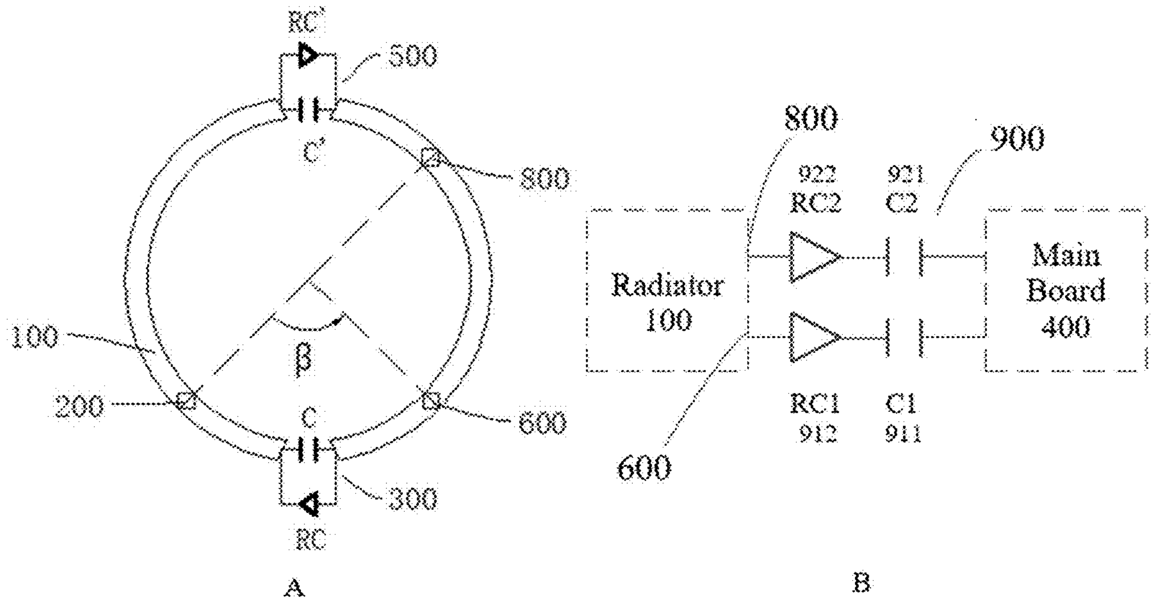
FIG. 13 is a top-view schematic diagram illustrating that the first FM filter component is connected in parallel with the radiator at the first access portion, and the second FM filter component is also connected in parallel with the radiator at the second access portion, provided by an embodiment of the present application.

In one embodiment, as shown in FIG. 13, the access portion of the radiator includes a first access portion 600 and a second access portion 800. A first end of the first FM filter component 910 is electrically connected to the first access portion 600, a second end of the first FM filter component 910 is electrically connected to the main board 400, a first end of the second FM filter component 920 is electrically connected to the second access portion 800, and a second end of the second FM filter component 920 is electrically connected to the main board 400. A first end of the first filter element 912 is electrically connected to the first access portion 600, a second end of the first filter element 912 is electrically connected to a first end of the first frequency modulation element 911, and a second end of the first frequency modulation element 911 is electrically connected to the main board. A first end of the second filter element 922 is electrically connected to the second access portion 800, a second end of the second filter element 922 is electrically connected to a first end of the second frequency modulation element 921, and a second end of the second frequency modulation element 921 is electrically connected to the main board 400. The first FM filter component 910 is connected in parallel with the radiator 100, and the second FM filter component 920 is also connected in parallel with the radiator 100, thus, the first FM filter component 910 and the second FM filter component 920 are both connected in parallel with the radiator 100 to adjust the operating frequency of the dual-frequency circularly polarized antenna and filter out signals in the target frequency band. Among them, FIG. 13 is a top-view schematic diagram illustrating that the first FM filter component 910 is connected in parallel with the radiator 100 at the first access portion, and the second FM filter component 920 is also connected in parallel with the radiator 100 at the second access portion. Part A in FIG. 13 is a top-view schematic diagram illustrating the first access portion and the second access portion of the dual-frequency circularly polarized radiator being respectively positioned at a second included angle of 90° and a second included angle of 180°. Part B in FIG. 13 is a schematic diagram illustrating that the first FM filter component 910 is connected in parallel with the radiator 100 at the first access portion, and the second FM filter component 920 is also connected in parallel with the radiator 100 at the second access portion.

In one embodiment, as shown in FIG. 13, the first FM filter component 910 is connected in parallel with the radiator 100 at the first access portion, and the second FM filter component 920 is also connected in parallel with the radiator 100 at the second access portion. The first frequency modulation element 911 is the first capacitor C1, the first filter element 912 is the first filter RC1, the second frequency modulation element 921 is the second capacitor C2, and the second filter element 922 is the second filter RC2. A first end of the first filter RC1 is electrically connected to the first access portion 600, a second end of the first filter RC1 is electrically connected to a first end of the first capacitor C1, and a second end of the first capacitor C1 is electrically connected to the main board. A first end of the second filter RC2 is electrically connected to the second access portion 800, a second end of the second filter RC2 is electrically connected to a first end of the second capacitor C2, and a second end of the second capacitor C2 is electrically connected to the main board 400. If the first capacitor C1 is configured to adjust the frequency of the first communication frequency band of the circularly polarized antenna, and the first filter RC1 is configured to filter out the signals in the second communication frequency band, then the second capacitor C2 is configured to adjust frequency of the second communication frequency band of the circularly polarized antenna, and the second filter RC2 is configured to filter out the signals in the first communication frequency band. The first capacitor C1 is first connected in series with the first filter RC1, one end of the series-connected first capacitor C1 and first filter RC1 is connected to the first access portion, and the other end is connected to the main board, and the second capacitor C2 is first connected in series with the second filter RC2, one end of the series-connected second capacitor C2 and second filter RC2 is connected to the second access portion, and the other end is connected to the main board, thus, the first capacitor C1 and the second capacitor C2 are equivalent to being respectively connected in parallel with the radiator 100. According to the principle elaborated in the foregoing embodiments, the first capacitor C1 will cause a decrease in frequency of the first communication frequency band of the circularly polarized antenna, and the second capacitor C2 will also cause a decrease in frequency of the second communication frequency band of the circularly polarized antenna. Or alternatively, if the first capacitor C1 is configured to adjust the frequency of the second communication frequency band of the circularly polarized antenna and the first filter RC1 is configured to filter out the signals in the first communication frequency band, then the second capacitor C2 is configured to adjust the frequency of the first communication frequency band of the circularly polarized antenna, and the second filter RC2 is configured to filter out the signals in the second communication frequency band. According to the principle elaborated in the foregoing embodiments, the first capacitor C1 will cause a decrease in the frequency of the second communication frequency band of the circularly polarized antenna, and the second capacitor C2 will also cause a decrease in the frequency of the first communication frequency band of the circularly polarized antenna.

In one embodiment, the first FM filter component 910 is connected in parallel with the radiator 100 at the first access portion 600, and the second FM filter component 920 is also connected in parallel with the radiator 100 at the second access portion 800. The first frequency modulation element 911 may also be the first inductor L1, and the second frequency modulation element 921 may also be the second inductor L2, and the first inductor L1 and the second inductor L2 are respectively connected in parallel with the radiator 100. According to the principle elaborated in the foregoing embodiments, the frequency tunning of the circularly polarized antenna through the first inductor L1 and the second inductor L2 will both result in an increase in the frequency of the circularly polarized antenna.

In one embodiment, the first FM filter component 910 and the second FM filter component 920 are connected in series and then connected in series at the first breakpoint 610 of the first access portion 600. The first frequency modulation element 911 may also be the first inductor L1, and the second frequency modulation element 921 may also be the second capacitor C2, or alternatively, the first frequency modulation element 911 may also be the first capacitor C1, and the second frequency modulation element 921 may also be the second inductor L2. According to the principle elaborated in the foregoing embodiments, the frequency of the circularly polarized antenna can be adjusted to reduce or increase through the first inductor L1 and the second capacitor C2, or the first capacitor C1 and the second inductor L2, and whether the frequency of the circularly polarized antenna is reduced or increased is determined based on the values of the capacitors or inductors.

Figure 14:
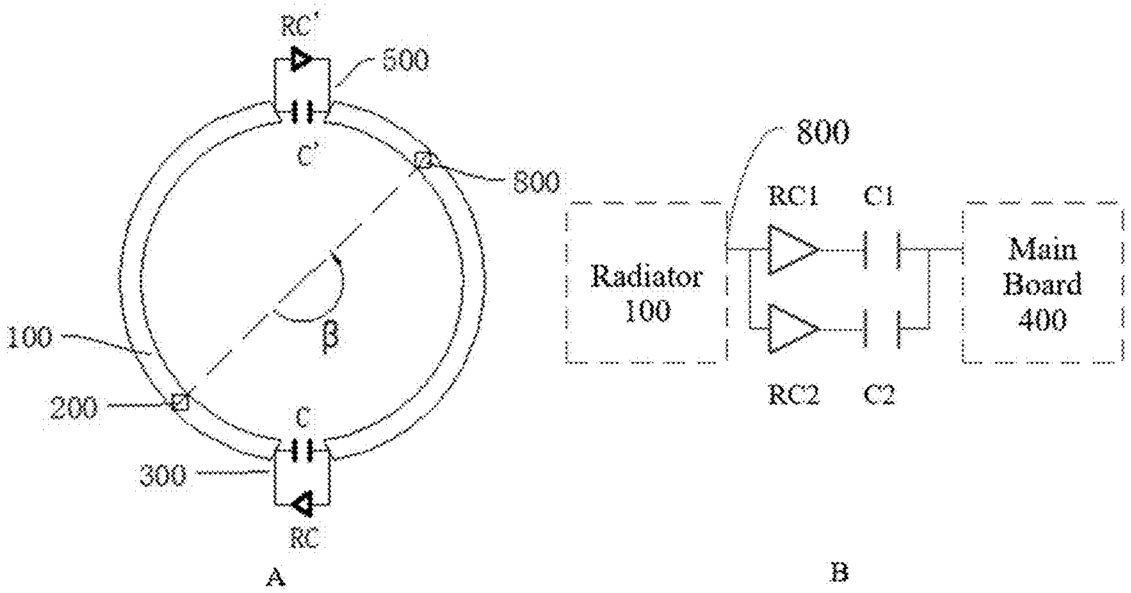
FIG. 14 is a top-view schematic diagram illustrating that the first FM filter component and the second FM filter component are connected in parallel first and then connected in parallel with the radiator, provided by an embodiment of the present application.

In one embodiment, as shown in FIG. 14, the first end of the first FM filter component 910 is electrically connected to the second access portion 800 and the first end of the second FM filter component 920, and the second end of the first FM filter component 910 is electrically connected to the main board 400 and the second end of the second FM filter component 920. Here, a first end of the first filter element 912 is electrically connected to the second access portion 800 and a first end of the second filter element 922. A second end of the first filter element 912 is electrically connected to a first end of the first frequency modulation element 911, and a second end of the second filter element 922 is electrically connected to a first end of the second frequency modulation element 921. A second end of the first frequency modulation element 911 is electrically connected to the main board 400 and a second end of the second frequency modulation element 921. The first FM filter component 910 and the second FM filter component 920 are first connected in parallel and then connected in parallel with the radiator 100, thus, the first FM filter component 910 and the second FM filter component 920 are both connected in parallel with the radiator 100 to adjust the operating frequency of the dual-frequency circularly polarized antenna and filter out signals in the target frequency band. FIG. 14 is a top-view schematic diagram illustrating that the first FM filter component 910 and the second FM filter component 920 are first connected in parallel and then connected in parallel with the radiator 100. Part A in FIG. 14 is a top-view schematic diagram illustrating the first access portion of the dual-frequency circularly polarized radiator being positioned at the second included angle of 180°. Part B in FIG. 14 is a schematic diagram of the principle of the first FM filter component 910 and the second FM filter component 920 being first connected in parallel and then the whole being connected in parallel with the radiator 100.

In one embodiment, as shown in FIG. 14, the first FM filter component 910 and the second FM filter component 920 are first connected in parallel and then connected in parallel with the radiator 100. The first frequency modulation element 911 is the first capacitor C1, the first filter element 912 is the first filter RC1, the second frequency modulation element 921 is the second capacitor C2, and the second filter element 922 is the second filter RC2. Here, a first end of the first filter RC1 is electrically connected to the second access portion 800 and a first end of the second filter RC2. A second end of the first filter RC1 is electrically connected to a first end of the first capacitor C1, and a second end of the second filter RC2 is electrically connected to a first end of the second capacitor C2. A second end of the first capacitor C1 is electrically connected to the main board 400 and a second end of the second capacitor C2. If the first capacitor C1 is configured to adjust the frequency of the first communication frequency band of the circularly polarized antenna, the first filter RC1 is configured to filter out the signals in the second communication frequency band, then the second capacitor C2 is configured to adjust the frequency of the second communication frequency band of the circularly polarized antenna, and the second filter RC2 is configured to filter out the signals in the first communication frequency band. The first capacitor C1 is first connected in series with the first filter RC1, the second capacitor C2 is first connected in series with the second filter RC2, and then the two are connected in parallel, one end is connected to the first access portion, and the other end is connected to the main board, so the first capacitor C1 and the second capacitor C2 are equivalent to being connected in parallel with the radiator 100. According to the principle elaborated in the foregoing embodiments, the first capacitor C1 will cause a decrease in the frequency of the first communication frequency band of the circularly polarized antenna, and the second capacitor C2 will also cause a decrease in the frequency of the second communication frequency band of the circularly polarized antenna. Or alternatively, if the first capacitor C1 is configured to adjust the frequency of the second communication frequency band of the circularly polarized antenna and the first filter RC1 is configured to filter out the signals in the first communication frequency band, then the second capacitor C2 is configured to adjust the frequency of the first communication frequency band of the circularly polarized antenna, and the second filter RC2 is configured to filter out the signals in the second communication frequency band. According to the principle elaborated in the foregoing embodiments, the first capacitor C1 will cause a decrease in the frequency of the second communication frequency band of the circularly polarized antenna, and the second capacitor C2 will also cause a decrease in the frequency of the first communication frequency band of the circularly polarized antenna.

In one embodiment, the first FM filter component 910 and the second FM filter component 920 are first connected in parallel and then connected in parallel with the radiator 100. Here, the first frequency modulation element 911 may also be the first inductor L1, and the second frequency modulation element 921 may also be the second inductor L2, and the first inductor L1 and the second inductor L2 are respectively connected in parallel with the radiator 100. According to the principle elaborated in the foregoing embodiments, the frequency tunning of the circularly polarized antenna through the first inductor L1 and the second inductor L2 will both result in an increase in the frequency of the circularly polarized antenna.

In one embodiment, the first FM filter component 910 and the second FM filter component 920 are first connected in parallel and then connected in parallel with the radiator 100. The first frequency modulation element 911 may also be the first inductor L1 and the second frequency modulation element 921 may also be the second capacitor C2, or alternatively, the first frequency modulation element 911 may also be the first capacitor C1 and the second frequency modulation element 921 may also be the second inductor L2. According to the principle elaborated in the foregoing embodiments, the frequency of the circularly polarized antenna can be adjusted to reduce or increase through the first inductor L1 and the second capacitor C2, or the first capacitor C1 and the second inductor L2, and whether the frequency of the circularly polarized antenna is reduced or increased is determined according to the values of the capacitors or inductors.

Figure 15:
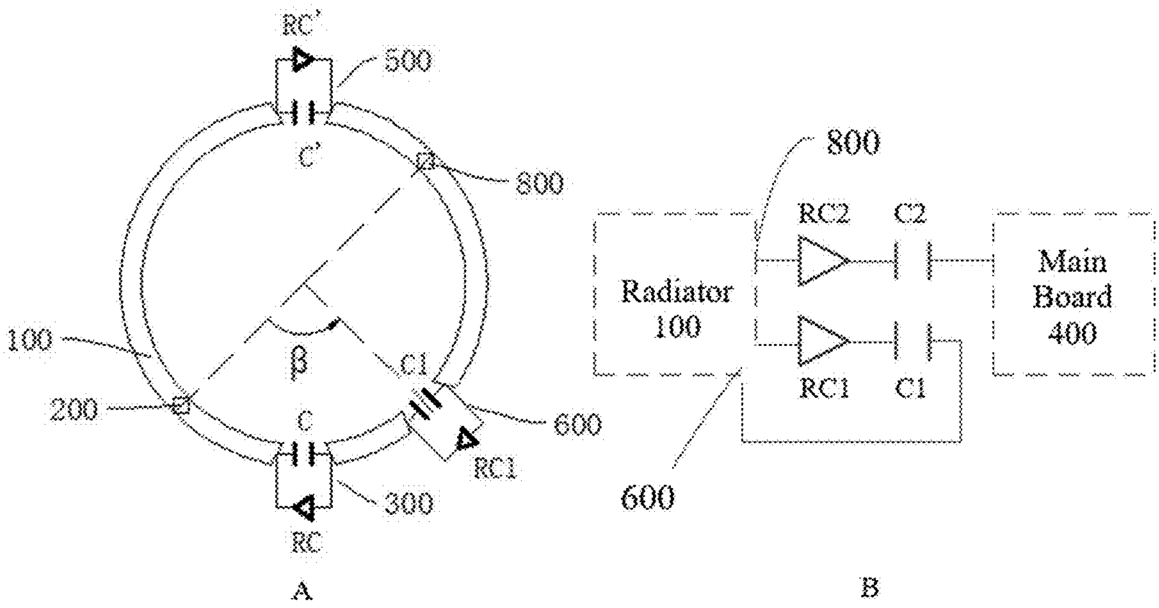
FIG. 15 is a top-view schematic diagram illustrating that the first FM filter component is connected in series with the radiator, and the second FM filter component is connected in parallel with the radiator, provided by an embodiment of the present application.

In one embodiment, as shown in FIG. 15, the access portion of the radiator includes a first access portion 600 and a second access portion 800. The first access portion 600 is provided with a first breakpoint 610. The first FM filter component 910 is connected in series to the first access portion 600 at the first breakpoint 610. A first end of the second FM filter component 920 is electrically connected to the second access portion 800, and a second end of the second FM filter component 920 is electrically connected to the main board 400. A first end of the first FM filter component 910 is electrically connected to the first electrical coupling module 620, a second end of the first FM filter component 910 is electrically connected to the second electrical coupling module 630. A first end of the first frequency modulation element 911 is electrically connected to the first electrical coupling module 620 and a first end of the first filter element 912. A second end of the first frequency modulation element 911 is electrically connected to the second electrical coupling module 630 and a second end of the first filter element 912. A first end of the second filter element 922 is electrically connected to the second access portion 800, a second end of the second filter element 922 is electrically connected to a first end of the second frequency modulation element 921, and a second end of the first frequency modulation element 911 is electrically connected to the main board 400. The first FM filter component 910 is connected in series with the radiator 100, and the second FM filter component 920 is connected in parallel with the radiator 100, to adjust the operating frequency of the dual-frequency circularly polarized antenna and filter out the signals in the target frequency band. FIG. 15 is a top-view schematic diagram illustrating that the first FM filter component 910 is connected in series with the radiator 100 and the second FM filter component 920 is connected in parallel with the radiator 100, part A in FIG. 15 is a top-view schematic diagram illustrating the first access portion and the second access portion of the dual-frequency circularly polarized radiator being respectively positioned at the second included angle of 90° and the second included angle of 180°, and part B in FIG. 15 is a schematic diagram illustrating that the first FM filter component 910 is connected in series with the radiator 100 and the second FM filter component 920 is connected in parallel with the radiator 100.

In one embodiment, as shown in FIG. 15, the first FM filter component 910 is connected in series with the radiator 100, the second FM filter component 920 is connected in parallel with the radiator 100. The first frequency modulation element 911 is the first capacitor C1, the first filter element 912 is the first filter RC1, the second frequency modulation element 921 is the second capacitor C2, and the second filter element 922 is the second filter RC2. Here, a first end of the first capacitor C1 is electrically connected to the first electrical coupling module 620 and a first end of the first filter RC1. A second end of the first capacitor C1 is electrically connected to the second electrical coupling module 630 and a second end of the first filter RC1. A first end of the second filter RC2 is electrically connected to the second access portion 800, a second end of the second filter RC2 is electrically connected to a first end of the second capacitor C2, and a second end of the second capacitor C2 is electrically connected to the main board 400. If the first capacitor C1 is configured to adjust the frequency of the first communication frequency band of the circularly polarized antenna and the first filter RC1 is configured to filter out the signals in the second communication frequency band, then the second capacitor C2 is configured to adjust the frequency of the second communication frequency band of the circularly polarized antenna and the second filter RC2 is configured to filter out the signals in the first communication frequency band. Since the first capacitor C1 is first connected in parallel with the first filter RC1 and then connected in series with the radiator 100, the first capacitor C1 is connected in series with the radiator 100. The second capacitor C2 is first connected in series with the second filter RC2 and then connected in parallel with the radiator 100. According to the principle elaborated in the foregoing embodiments, the first capacitor C1 will cause an increase in the frequency of the first communication frequency band of the circularly polarized antenna, and the second capacitor C2 will cause a decrease in the frequency of the second communication frequency band of the circularly polarized antenna. Or alternatively, if the first capacitor C1 is configured to adjust the frequency of the second communication frequency band of the circularly polarized antenna and the first filter RC1 is configured to filter out the signals in the first communication frequency band, then the second capacitor C2 is configured to adjust the frequency of the first communication frequency band of the circularly polarized antenna and the second filter RC2 is configured to filter out the signals in the second communication frequency band. According to the principle elaborated in the foregoing embodiments, the first capacitor C1 will cause an increase in the frequency of the second communication frequency band of the circularly polarized antenna, and the second capacitor C2 will cause a decrease in the frequency of the first communication frequency band of the circularly polarized antenna.

In one embodiment, the first FM filter component 910 is connected in series with the radiator 100, and the second FM filter component 920 is connected in parallel with the radiator 100. The first frequency modulation element 911 may also be the first inductor L1, and the second frequency modulation element 921 may also be the second inductor L2, and the first inductor L1 and the second inductor L2 are respectively connected in series and in parallel with the radiator 100. According to the principle elaborated in the foregoing embodiments, the frequency tunning of the circularly polarized antenna through the first inductor L1 will result in a decrease in the frequency of the circularly polarized antenna, and the frequency tunning of the circularly polarized antenna through the second inductor L2 will result in an increase in the frequency of the circularly polarized antenna.

In one embodiment, the first FM filter component 910 is connected in series with the radiator 100, and the second FM filter component 920 is connected in parallel with the radiator 100. The first frequency modulation element 911 may also be the first inductor L1, and the second frequency modulation element 921 may also be the second capacitor C2, that is, the first inductor L1 is equivalent to being connected in series with the radiator 100, and the second capacitor C2 is equivalent to being connected in parallel with the radiator 100. According to the principle elaborated in the foregoing embodiments, the frequency tunning of the circularly polarized antenna through the first inductor L1 and the second capacitor C2 will both result in a decrease in the frequency of the circularly polarized antenna. Or alternatively, the first frequency modulation element 911 may also be the first capacitor C1, and the second frequency modulation element 921 may also be the second inductor L2, that is, the first capacitor C1 is equivalent to being connected in series with the radiator 100, and the second inductor L2 is equivalent to being connected in parallel with the radiator 100. According to the principle elaborated in the foregoing embodiments, the frequency tunning of the circularly polarized antenna through the first capacitor C1 and the second inductor L2 will both result in an increase in the frequency of the circularly polarized antenna.

In some embodiments, the circularly polarized antenna includes at least one of a satellite positioning GPS antenna, a Bluetooth antenna, a WIFI antenna, or a 4G/5G antenna. The center frequency of the GPS signals in the L1 frequency band is approximately 1.575 GHZ, the center frequency of the GPS signals in the L5 frequency band is approximately 1.176 GHZ, and the frequency of the Bluetooth signal or the WIFI signal is 2.4 GHz.

In some embodiments, the center frequency of the circular polarization formed by the dual-frequency circularly polarized antenna has a first communication frequency band of 1.4 GHz, and a second communication frequency band of 2.1 GHZ. In order to make the center frequency of the circular polarization close to the center frequency of the GPS signals in the L1 and L5 frequency bands, it is required to reduce the first communication frequency band from 1.4 GHz to 1.176 GHz, i.e., the center frequency of the GPS signal in the L5 frequency band, and reduce the second communication frequency band from 2.1 GHz to 1.575 GHz, i.e., the center frequency of the GPS signal in the L1 frequency band. According to the principle elaborated in the foregoing embodiments, if the first frequency modulation element 911 is the first capacitor C1, which is configured to adjust the frequency of the first communication frequency band from 1.4 GHz to 1.176 GHZ, and the second frequency modulation element 921 is the second capacitor C2, which is configured to adjust the frequency of the second communication frequency band from 2.1 GHz to 1.575 GHz, the first capacitor C1 and the second capacitor C2 are first connected in series and then the whole is connected in parallel with the radiator 100, or alternatively, the first capacitor C1 and the second capacitor C2 are first connected in parallel and then the whole is connected in parallel with the radiator 100, or alternatively, the first capacitor C1 is connected in parallel with the radiator 100, and the second capacitor C2 is also connected in parallel with the radiator 100. The above schemes can all reduce the frequencies of the first communication frequency band and the second communication frequency band of the dual-frequency circularly polarized antenna respectively.

In some embodiments, the center frequency of the circular polarization formed by the dual-frequency circularly polarized antenna has a first communication frequency band of 1.4 GHz, and a second communication frequency band of 2.1 GHZ. In order to make the center frequency of the circular polarization close to the center frequency of the GPS signals in the L1 and L5 frequency bands, it is required to reduce the first communication frequency band from 1.4 GHz to 1.176 GHZ, i.e., the center frequency of the GPS signal in the L5 frequency band, and reduce the second communication frequency band from 2.1 GHz to 1.575 GHz, i.e., the center frequency of the GPS signal in the L1 frequency band. According to the principle elaborated in the foregoing embodiments, if the first frequency modulation element 911 is the first inductor L1, which is configured to adjust the frequency of the first communication frequency band from 1.4 GHz to 1.176 GHZ, and the second frequency modulation element 921 is the second inductor L2, which is configured to adjust the frequency of the second communication frequency band from 2.1 GHz to 1.575 GHz, the first inductor L1 and the second inductor L2 are first connected in series and then the whole is connected in series with the radiator 100, or alternatively, the first inductor L1 and the second inductor L2 are first connected in parallel and then the whole is connected in series with the radiator 100, or alternatively, the first inductor L1 is connected in series with the radiator 100, and the second inductor L2 is also connected in series with the radiator 100. The above schemes can all reduce the frequency of the first communication frequency band and the second communication frequency band of the dual-frequency circularly polarized antenna, respectively.

In some embodiments, the center frequency of the circular polarization formed by the dual-frequency circularly polarized antenna has a first communication frequency band of 1.4 GHz, and a second communication frequency band of 2.1 GHZ. In order to make the center frequency of the circular polarization close to the center frequency of the GPS signals in the L1 and L5 frequency bands, it is required to reduce the first communication frequency band from 1.4 GHz to 1.176 GHz, i.e., the center frequency of the GPS signal in the L5 frequency band, and reduce the second communication frequency band from 2.1 GHz to 1.575 GHz, i.e., the center frequency of the GPS signal in the L1 frequency band. According to the principle elaborated in the foregoing embodiments, if the first frequency modulation element 911 is the first capacitor C1, which is configured to adjust the frequency of the first communication frequency band from 1.4 GHz to 1.176 GHZ, and the second frequency modulation element 921 is the second inductor L2, which is configured to adjust the frequency of the second communication frequency band from 2.1 GHz to 1.575 GHz, then it is required that the first capacitor C1 is equivalent to being connected in parallel with the radiator 100, and the second inductor L2 is equivalent to being connected in series with the radiator 100. The above scheme allows the frequencies of the first communication band and the second communication band of the dual-frequency circularly polarized antenna to be reduced respectively.

In some embodiments, the center frequency of the circular polarization formed by the dual-frequency circularly polarized antenna has a first communication frequency band of 1.4 GHz, and a second communication frequency band of 2.1 GHZ. In order to make the center frequency of the circular polarization close to the center frequency of the GPS signals in the L1 and L5 frequency bands, it is required to reduce the first communication frequency band from 1.4 GHz to 1.176 GHZ, i.e., the center frequency of the GPS signal in the L5 frequency band, and reduce the second communication frequency band from 2.1 GHz to 1.575 GHz, i.e., the center frequency of the GPS signal in the L1 frequency band. According to the principle elaborated in the foregoing embodiments, the frequencies of the first communication band and the second communication band of the dual-frequency circularly polarized antenna can also be correspondingly increased, which will not be repeated here.

In other embodiments, the center frequency of the circular polarization formed by the dual-frequency circularly polarized antenna has a first communication frequency band of 1.1 GHZ, and a second communication frequency band of 2.0 GHz. In order to make the center frequency of the circular polarization close to the center frequency of the GPS signal in the L1 and L5 frequency bands, it is required to increase the first communication frequency band from 1.1 GHz to 1.176 GHZ, i.e., the center frequency of the GPS signal in the L5 frequency band, and reduce the second communication frequency band from 2.0 GHz to 1.575 GHz, i.e., the center frequency of the GPS signal in the L1 frequency band. According to the principle elaborated in the foregoing embodiments, if the first frequency modulation element 911 is the first capacitor C1, which is configured to adjust the frequency of the first communication frequency band from 1.1 GHz to 1.176 GHZ, and the second frequency modulation element 921 is the second inductor L2, which is configured to adjust the frequency of the second communication frequency band from 2.0 GHz to 1.575 GHz, then it is required that the first capacitor C1 is equivalent to being connected in series with the radiator 100, and the second inductor L2 is equivalent to being connected in series with the radiator 100, which can achieve the increasing of the first communication frequency band of the dual-frequency circularly polarized antenna from 1.1 GHz to 1.176 GHZ, and the decreasing of the frequency of the second communication frequency band of the dual-frequency circularly polarized antenna from 2.0 GHz to 1.575 GHz. Or alternatively, if the first frequency modulation element 911 is the first inductor L1, which is configured to adjust the frequency of the first communication frequency band from 1.1 GHz to 1.176 GHZ, and the second frequency modulation element 921 is the second capacitor C2, which is configured to adjust the frequency of the second communication frequency band from 2.0 GHz to 1.575 GHz, then it is required that the first inductor L1 is equivalent to being connected in parallel with the radiator 100, and the second capacitor C2 is equivalent to being connected in parallel with the radiator 1001, which can achieve the increasing of the first communication frequency band of the dual-frequency circularly polarized antenna from 1.1 GHz to 1.176 GHZ, and the decreasing of the frequency of the second communication frequency band of the dual-frequency circularly polarized antenna from 2.0 GHz to 1.575 GHz.

In some embodiments, the frequency tunning component 700 may also include either multiple capacitors or multiple inductors, or both the multiple capacitors and the multiple inductors. The principle is similar to the above embodiment. Since the capacitors, the inductors, or both the capacitor and the inductor can alter the effective length of the ring radiator, the operating center frequency of the circularly polarized antenna shifts synchronously, thereby allowing the tunning of the operating frequency of the circularly polarized antenna. Further elaboration is omitted here.

The above embodiments are only used to illustrate rather than limit the technical schemes of the present application. Although the present application is described in detail with reference to the foregoing embodiments, ordinary technicians in this field should understand that they can still modify the technical schemes recorded in the above embodiments, or replace some of the technical features in the embodiments by equivalents. These modifications or replacements do not make the essence of the corresponding technical schemes deviate from the spirit and scope of the technical schemes of the embodiments of the present application, and thus should all be included within the protection scope of the present application.

What is claimed is:

1. A circularly polarized antenna, comprising:

a main board;

an annular radiator, the annular radiator being provided with an access portion;

a feeding terminal, one end of the feeding terminal being electrically connected to the annular radiator at a feeding point, and another end of the feeding terminal being electrically connected to the main board; and a frequency tunning component, configured to adjust a frequency of a communication frequency band of the circularly polarized antenna, the frequency tunning component being electrically connected to the annular radiator at the access portion;

wherein, a first connecting line including the feeding point and a second connecting line including the access portion form a first included angle along a first direction, the first connecting line is a line connecting the feeding point and a center point of the annular radiator, the second connecting line is a line connecting a center point of the access portion and the center point of the annular radiator, and the first direction is a counterclockwise circumferential direction along the annular radiator;

wherein, $\alpha \in (80°, 100°) \cup (170°, 190°) \cup (260°, 280°)$ and $\alpha$ is the first included angle.

2. The circularly polarized antenna according to claim 1, wherein the first included angle comprises any one of 90°, 180° or 270°.

3. The circularly polarized antenna according to claim 1, wherein the annular radiator is provided with a first breakpoint, the access portion comprises a first electrical coupling module and a second electrical coupling module, the first electrical coupling module and the second electrical coupling module are respectively arranged at two opposite ends of the first breakpoint, one end of the frequency tunning component is connected to the first electrical coupling module, and the another end of the frequency tunning component is connected to the second electrical coupling module.

4. The circularly polarized antenna according to claim 3, wherein $\alpha \in (170°, 190°)$, and $\alpha$ is the first included angle.

5. The circularly polarized antenna according to claim 1, wherein one end of the frequency tunning component is electrically connected to the access portion, and another end of the frequency tunning component is electrically connected to the main board.

6. The circularly polarized antenna according to claim 5, wherein $\alpha \in (80°, 100°) \cup (260°, 280°)$, and $\alpha$ is the first included angle.

7. The circularly polarized antenna according to claim 1, wherein the frequency tunning component comprises either a first capacitor or a first inductor, or both the first capacitor and the first inductor.

8. A dual-frequency circularly polarized antenna, comprising:

a main board;

an annular radiator, the annular radiator being provided with an access portion;

a feeding terminal, one end of the feeding terminal being electrically connected to the annular radiator at a feeding point, and another end of the feeding terminal being electrically connected to the main board; and a frequency modulation (FM) filter component electrically connected to the access portion, the frequency modulation (FM) filter component being configured to filter out signals in a second communication frequency band when adjusting a frequency of a first communication frequency band of the circularly polarized antenna; or alternatively, configured to filter out signals in the first communication frequency band when adjusting a frequency of the second communication frequency band of the circularly polarized antenna.

9. The dual-frequency circularly polarized antenna according to claim 8, wherein the circularly polarized antenna further comprises signals in a third communication frequency band, and the signals in the third communication frequency band are signals outside the first communication frequency band and the second communication frequency band; and the frequency modulation (FM) filter component is further configured to filter out the signals in the third communication frequency band when filtering out the signals in the first communication frequency band or the signals in the second communication frequency band.

10. The dual-frequency circularly polarized antenna according to claim 8, wherein the feeding point and the access portion are respectively arranged at preset positions of the annular radiator, and a first resonant current and a second resonant current at the preset positions are substantially the same, wherein the first resonant current is a resonant current of the annular radiator in a first mode, and the second resonant current is a resonant current of the annular radiator in a second mode.

11. The dual-frequency circularly polarized antenna according to claim 8, wherein a first connecting line including the feeding point and a second connecting line including the access portion form a second included angle along a first direction; and wherein, the first connecting line is a line connecting the feeding point and a center point of the annular radiator, the second connecting line is a line connecting a center point of the access portion and the center point of the annular radiator, the first direction is a counterclockwise circumferential direction of the annular radiator, wherein, $\beta \in (80°, 100°) \cup (170°, 190°) \cup (260°, 280°)$ and $\beta$ is the second included angle.

12. The dual-frequency circularly polarized antenna according to claim 11, wherein the second included angle comprises any one of 90°, 180° or 270°.

13. The dual-frequency circularly polarized antenna according to claim 8, wherein the frequency modulation (FM) filter component comprises a first FM filter component;

the first FM filter component is configured to filter out the signals in the second communication frequency band when adjusting the frequency of the first communication frequency band of the circularly polarized antenna; or alternatively, the first FM filter component is configured to filter out the signals in the first communication frequency band when adjusting the frequency of the second communication frequency band of the circularly polarized antenna.

14. The dual-frequency circularly polarized antenna according to claim 13, wherein the first FM filter component comprises a first frequency modulation element and a first filter element;

the first frequency modulation element is configured to adjust the frequency of the first communication frequency band of the circularly polarized antenna, and the first filter element is configured to filter out the signals in the second communication frequency band; or alternatively, the first frequency modulation element is configured to adjust the frequency of the second communication frequency band of the circularly polarized antenna, and the first filter element is configured to filter out the signals in the first communication frequency band.

15. The dual-frequency circularly polarized antenna according to claim 14, wherein the frequency modulation (FM) filter component also comprises a second FM filter component;

if the first FM filter component is configured to adjust the frequency of the first communication frequency band of the circularly polarized antenna and filter out the signals in the second communication frequency band, then the second FM filter component is configured to filter out the signals in the first communication frequency band when adjusting the frequency of the second communication frequency band of the circularly polarized antenna; and if the first FM filter component is configured to adjust the frequency of the second communication frequency band of the circularly polarized antenna and filter out the signals in the first communication frequency band, then the second FM filter component is configured to filter out the signals in the second communication frequency band when adjusting the frequency of the first communication frequency band of the circularly polarized antenna.

16. The dual-frequency circularly polarized antenna according to claim 15, wherein the second FM filter component comprises a second frequency modulation element and a second filter element;

the second frequency modulation element is configured to adjust the frequency of the first communication frequency band, and the second filter element is configured to filter out the signals in the second communication frequency band; or alternatively, the second frequency modulation element is configured to adjust the frequency of the second communication frequency band, and the second filter element is configured to filter out the signals in the first communication frequency band.

17. The dual-frequency circularly polarized antenna according to claim 16, wherein the access portion of the annular radiator comprises a first access portion, the first access portion is provided with a first breakpoint, and the first access portion comprises a first electrical coupling module and a second electrical coupling module; and the first electrical coupling module and the second electrical coupling module are respectively arranged at two opposite ends of the first breakpoint.

18. The dual-frequency circularly polarized antenna according to claim 17, wherein a first end of the first FM filter component is electrically connected to the first electrical coupling module, and a second end of the first FM filter component is electrically connected to the second electrical coupling module; and wherein, a first end of the first frequency modulation element is electrically connected to the first electrical coupling module and a first end of the first filter element, and a second end of the first frequency modulation element is electrically connected to the second electrical coupling module and a second end of the first filter element.

19. The dual-frequency circularly polarized antenna according to claim 17, wherein a first end of the first FM filter component is electrically connected to the first electrical coupling module, a second end of the first FM filter component is electrically connected to a first end of the second FM filter component, and a second end of the second FM filter component is electrically connected to the second electrical coupling module; and wherein, a first end of the first frequency modulation element is electrically connected to the first electrical coupling module and a first end of the first filter element, a second end of the first frequency modulation element is electrically connected to a second end of the first filter element, a first end of the second frequency modulation element and a first end of the second filter element, and a second end of the second frequency modulation element is electrically connected to a second end of the second filter element and the second electrical coupling module.

20. The dual-frequency circularly polarized antenna according to claim 17, wherein the access portion of the annular radiator further comprises a second access portion, the second access portion is provided with a second breakpoint, the access portion comprises a third electrical coupling module and a fourth electrical coupling module, the third electrical coupling module and the fourth electrical coupling module are respectively arranged at two opposite ends of the second breakpoint;

a first end of the second FM filter component is electrically connected to the third electrical coupling module, and a second end of the second FM filter component is electrically connected to the fourth electrical coupling module; and wherein, a first end of the second frequency modulation element is electrically connected to the third electrical coupling module and a first end of the second filter element, and a second end of the second frequency modulation element is electrically connected to the fourth electrical coupling module and a second end of the second filter element.

21. The dual-frequency circularly polarized antenna according to claim 16, wherein the access portion of the annular radiator comprises a first access portion and a second access portion;

a first end of the first FM filter component is electrically connected to the first access portion, a second end of the first FM filter component is electrically connected to the main board, a first end of the second FM filter component is electrically connected to the second access portion, and a second end of the second FM filter component is electrically connected to the main board; and wherein, a first end of the first filter element is electrically connected to the first access portion, a second end of the first filter element is electrically connected to a first end of the first frequency modulation element, and a second end of the first frequency modulation element is electrically connected to the main board; a first end of the second filter element is electrically connected to the second access portion, a second end of the second filter element is electrically connected to a first end of the second frequency modulation element, and a second end of the second frequency modulation element is electrically connected to the main board.

22. The dual-frequency circularly polarized antenna according to claim 16, wherein a first end of the first FM filter component is electrically connected to the access portion and a first end of the second FM filter component, and a second end of the first FM filter component is electrically connected to a second end of the second FM filter component and the main board; and wherein, a first end of the first filter element is electrically connected to the access portion and a first end of the second filter element, a second end of the first filter element is electrically connected to a first end of the first frequency modulation element, a second end of the second filter element is electrically connected to a first end of the second frequency modulation element, and a second end of the first frequency modulation element is electrically connected to the main board and a second end of the second frequency modulation element.

* * * * *